(12) United States Patent
Fukasawa et al.

(10) Patent No.: US 10,146,491 B2
(45) Date of Patent: Dec. 4, 2018

(54) PRINTING SYSTEM, SERVER APPARATUS, INFORMATION PROCESSING METHOD, AND COMPUTER-READABLE RECORDING MEDIUM

(71) Applicants: Naoki Fukasawa, Kanagawa (JP); Rina Takahashi, Kanagawa (JP)

(72) Inventors: Naoki Fukasawa, Kanagawa (JP); Rina Takahashi, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 15/701,793

(22) Filed: Sep. 12, 2017

(65) Prior Publication Data

US 2018/0074763 A1  Mar. 15, 2018

(30) Foreign Application Priority Data

Sep. 13, 2016 (JP) ................................ 2016-178822
Nov. 18, 2016 (JP) ................................ 2016-225267

(51) Int. Cl.
*G06F 3/12* (2006.01)
*H04N 1/00* (2006.01)

(52) U.S. Cl.
CPC .......... *G06F 3/1248* (2013.01); *G06F 3/1212* (2013.01); *G06F 3/1236* (2013.01); *G06F 3/1286* (2013.01); *H04N 1/00037* (2013.01); *H04N 1/00244* (2013.01); *H04N 1/00408* (2013.01); *H04N 2201/0094* (2013.01)

(58) Field of Classification Search
None
See application file for complete search history.

(56) References Cited

U.S. PATENT DOCUMENTS

| | | | | |
|---|---|---|---|---|
| 2011/0299126 A1* | 12/2011 | Nakata | .................. | G06F 3/1204 358/1.15 |
| 2012/0327463 A1* | 12/2012 | Mizuno | ................... | G06F 3/122 358/1.15 |
| 2014/0320895 A1* | 10/2014 | Farthing | ................. | G06F 3/126 358/1.15 |

FOREIGN PATENT DOCUMENTS

JP        2010-181948        8/2010
JP      2010181948 A  *   8/2010

\* cited by examiner

*Primary Examiner* — Ted Barnes
(74) *Attorney, Agent, or Firm* — Harness, Dickey & Pierce, P.L.C.

(57) ABSTRACT

A printing system includes one or more of information processing apparatuses, an image forming apparatus, a storage storing pieces of job information on print jobs, and circuitry. The circuitry is configured to execute: receiving the print target data from the information processing apparatus; receiving a history of pieces of job information corresponding to user identification information corresponding to the target data from the storage; estimating, based on the history, a type of a PDL to which the target data is converted; generating PDL data by converting the target data to the PDL of which the type is estimated; transmitting the PDL data to the image forming apparatus when the estimated PDL is available for the image forming apparatus; and selecting, when the estimated PDL is not available for the image forming apparatus, a PDL available for the image forming apparatus and re-converting the print target data to the selected PDL.

17 Claims, 21 Drawing Sheets

FIG.9

| |
|---|
| id: AAAAAAAA<br>user: user1<br>status: accepted<br>pdl_type: pdl1<br>display_name: Print Job A<br>date: 2016-01-10T09:41:01.845Z<br>config: {copies: 1, colormode: color, size: a4, duplex: none, layout: 2in1}<br>document_url: https://xxxxxxx.com/docs/user1/jd7roft2.pdf<br>pdl_url: - ~A |
| id: BBBBBBBB<br>user: user1<br>status: completed<br>pdl_type: pdl1<br>display_name: Print Job B<br>date: 2016-01-10T08:56:23.067Z<br>config: {copies: 1, colormode: mono, size: a4, duplex: none, layout: none}<br>document_url: https://xxxxxxx.com/docs/user1/1hjdowdz.jpg<br>pdl_url: https://xxxxxxx.com/pdls/user1/jdyrnf1y ~B |
| id: CCCCCCCC<br>user: user1<br>status: ready<br>pdl_type: pdl2<br>display_name: Print Job C<br>date: 2016-01-09T20:31:11.947Z<br>config: {copies: 2, colormode: color, size: a3, duplex: none, layout: none}<br>document_url: https://xxxxxxx.com/docs/user1/okdynf7a.pdf<br>pdl_url: https://xxxxxxx.com/pdls/user1/s6rh9kma ~C |
| id: DDDDDDDD<br>user: user1<br>status: completed<br>pdl_type: pdl2<br>display_name: Print Job D<br>date: 2016-01-08T12:20:43.105Z<br>config: {copies: 1, colormode: color, size: a4, duplex: bind_left, layout: none}<br>document_url: https://xxxxxxx.com/docs/user1/tgd741bn.png<br>pdl_url: https://xxxxxxx.com/pdls/user1/sk8hg5nl ~D |
| id: EEEEEEEE<br>user: user1<br>status: completed<br>pdl_type: pdl1<br>display_name: Print Job E<br>date: 2016-01-08T10:08:23.097Z<br>config: {copies: 1, colormode: color, size: a4, duplex: none, layout: none}<br>document_url: https://xxxxxxx.com/docs/user1/z4e1oijr.pdf<br>pdl_url: https://xxxxxxx.com/pdls/user1/erdlgbzg ~E |
| id: FFFFFFFF<br>user: user1<br>status: ready<br>pdl_type: pdl2<br>display_name: Print Job F<br>date: 2016-01-06T15:45:52.072Z<br>config: {copies: 1, colormode: color, size: a4, duplex: none, layout: none}<br>document_url: https://xxxxxxx.com/docs/user1/ujstehdb.pdf<br>pdl_url: https://xxxxxxx.com/pdls/user1/lo6uy4a1 ~F |

⋮

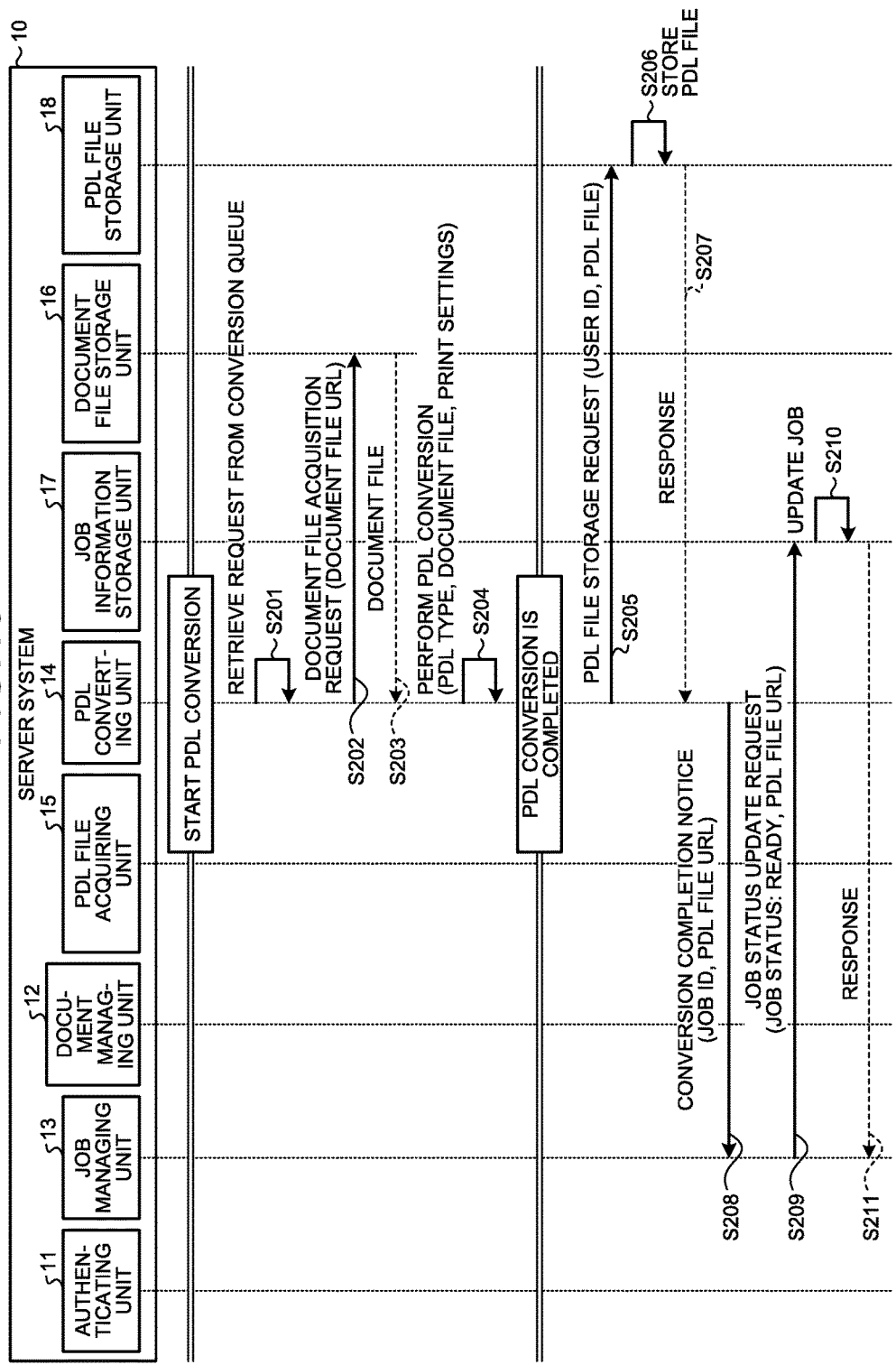

PRINTING SYSTEM, SERVER APPARATUS, INFORMATION PROCESSING METHOD, AND COMPUTER-READABLE RECORDING MEDIUM

CROSS-REFERENCE TO RELATED APPLICATIONS

The present application claims priority under 35 U.S.C. § 119 to Japanese Patent Application No. 2016-178822, filed on Sep. 13, 2016 and Japanese Patent Application No. 2016-225267, filed on Nov. 18, 2016. The contents of which are incorporated herein by reference in their entirety.

BACKGROUND OF THE INVENTION

1. Field of the Invention

The present invention relates to a printing system, a server apparatus, an information processing method, and a computer-readable recording medium.

2. Description of the Related Art

In recent years, a so-called location-free printing system has been developed, which is a system that causes an arbitrary apparatus (an image forming apparatus) connected to a network to perform printout for a print job submitted by a client device. When printing is performed in the location-free system as described above, an apparatus that performs printout remains unknown until the moment the printout is actually performed. Furthermore, an interpretable page description language (PDL) is different for each of apparatuses, and the apparatuses are unable to perform printing if they receive a file (a PDL file) described in an uninterpretable PDL. As a means to solve the situation as described above, for example, the following measures (1) to (4) may be applied.
(1) To perform conversion to a PDL that can be output to all of the apparatuses.
(2) To perform conversion to all of PDLs that may possibly be output, and then stand ready.
(3) To determine an apparatus that performs output, and then perform conversion to a PDL compliant with the apparatus.
(4) To perform conversion to a PDL in advance, and then transmit the converted PDL to a server.

However, the above-described measures (1) to (4) have problems as described below.
(1) PDLs that are realistically available are usually dependent on models, which is problematic.
(2) The load on the server for a PDL conversion process and a data storage operation increases.
(3) It takes a long time before printing because PDL conversion is started after the apparatus is determined, which results in the reduced convenience.
(4) It is necessary to install a printer driver in a client, which prevents use from a web application or an application on a smartphone (hereinafter, may be simply referred to as an "application"), for example.

Furthermore, as a printing system to implement appropriate output in a printer that is arbitrarily selected by a user from among a plurality of printers with various different device settings, a technology has been disclosed in which a print server receives user identification information and a print file from a personal computer (PC) and stores the received print file in association with the user identification information; the print server extracts a print file corresponding to user identification information upon receiving the user identification information and a printout request from a multifunction peripheral (MFP), and acquires, from the MFP that has sent the request, device information, such as a page description language that can be interpreted by the MFP; and the print server generates print data by converting the extracted print file to the page description language acquired from the MFP and transmits the print data to the MFP (see Japanese Patent Application Laid-open No. 2010-181948).

However, in the system described in Japanese Patent Application Laid-open No. 2010-181948, a PDL conversion process is started after an apparatus that performs printout is determined; therefore, it takes a long time before printing, resulting in the reduced convenience.

In view of the problems as described above, there is a need to provide a printing system, a server apparatus, an information processing method, and a computer-readable recording medium capable of reducing a time taken from determination of an apparatus that performs printout to execution of printing.

SUMMARY OF THE INVENTION

It is an object of the present invention to at least partially solve the problems in the conventional technology.

According to embodiments, there is provided a printing system that includes one or more of information processing apparatuses and an image forming apparatus, and that generates page description language (PDL) data by converting print target data received from the one or more of information processing apparatuses to a PDL, and transmits the PDL data to the image forming apparatus. The printing system further comprises a storage configured to store therein pieces of job information on print jobs, and circuitry. The circuitry is configured to execute: receiving the print target data from the one or more of information processing apparatuses; receiving a history of pieces of job information corresponding to user identification information corresponding to the print target data from the storage; estimating, based on the history, a type of a PDL to which the print target data is converted; generating PDL data by converting the print target data to the PDL of which the type is estimated; transmitting the PDL data to the image forming apparatus when the estimated PDL is available for the image forming apparatus; and selecting, when the estimated PDL is not available for the image forming apparatus, a PDL available for the image forming apparatus and re-converting the print target data to the selected PDL.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 9 is a diagram illustrating an example of a job list;

FIG. 10 is a sequence diagram illustrating an example of a PDL conversion operation in the printing system according to the first embodiment;

The accompanying drawings are intended to depict exemplary embodiments of the present invention and should not be interpreted to limit the scope thereof. Identical or similar reference numerals designate identical or similar components throughout the various drawings.

DESCRIPTION OF THE EMBODIMENTS

Figure 1:
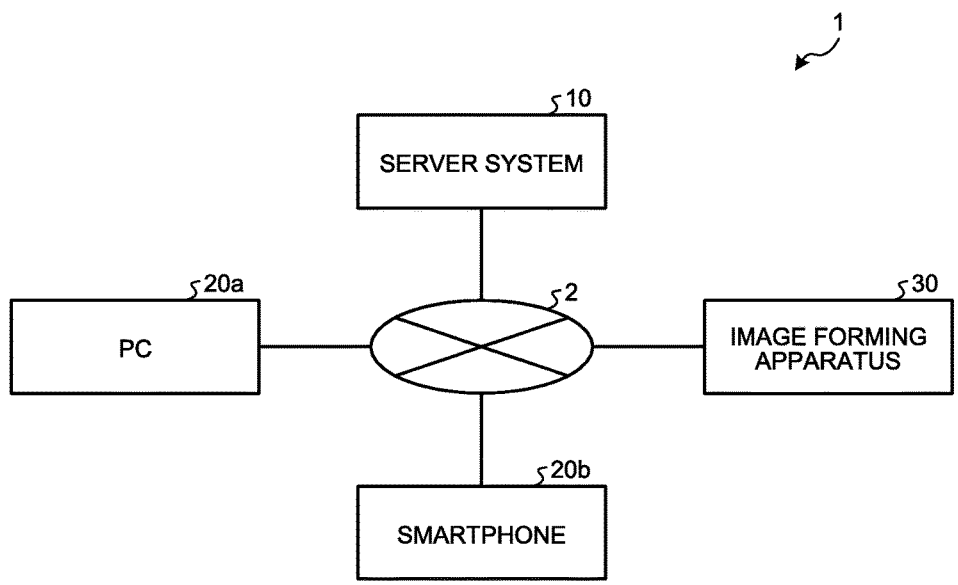
FIG. 1 is a diagram illustrating an example of an overall configuration of a printing system according to a first embodiment of the present invention.

The terminology used herein is for the purpose of describing particular embodiments only and is not intended to be limiting of the present invention.

As used herein, the singular forms "a", "an" and "the" are intended to include the plural forms as well, unless the context clearly indicates otherwise.

In describing preferred embodiments illustrated in the drawings, specific terminology may be employed for the sake of clarity. However, the disclosure of this patent specification is not intended to be limited to the specific terminology so selected, and it is to be understood that each specific element includes all technical equivalents that have the same function, operate in a similar manner, and achieve a similar result.

Embodiments of a printing system, a server apparatus, an information processing method, and a computer-readable recording medium according to the present invention will be described in detail below with reference to FIGS. 1 to 24. The present invention is not limited by the embodiments below. Components in the embodiments described below include one that can easily be thought of by a person skilled in the art, one that is practically identical, and one that is within an equivalent range. Furthermore, within the scope not departing from the gist of the following embodiments, various omission, replacement, and modifications of the components may be made.

First Embodiment

Overall Configuration of Printing System

FIG. 1 is a diagram illustrating an example of an overall configuration of a printing system according to a first embodiment. With reference to FIG. 1, an outline of the overall configuration of a printing system 1 will be described.

As illustrated in FIG. 1, the printing system 1 includes a server system 10, a personal computer (PC) 20a, a smartphone 20b, and an image forming apparatus 30, all of which are enabled to communicate with one another via a network 2, such as the Internet or a local area network (LAN). The network 2 may include not only a specific network but also a LAN, a wireless LAN, a dedicated line, or the like as a part thereof, in addition to the Internet, for example.

The server system 10 is a server system that, in order to construct a so-called location-free system, converts a document file (an example of print target data) received from the PC 20a, the smartphone 20b, or the like to an estimated PDL, and transmits a converted PDL file (an example of PDL data) to the image forming apparatus 30 that performs printout, as will be described below. The server system 10 does not necessarily have to be constructed by a single server apparatus, but may be constructed by a plurality of server apparatuses and other apparatuses. However, for simplicity of explanation, it is assumed that the server system 10 is constructed by a single server apparatus in the descriptions below.

The PC 20a and the smartphone 20b are examples of a client device that transmits a document file desired to be printed out to the server system 10 in order to convert the document file to a PDL. Hereinafter, the client devices such as the PC 20a and the smartphone 20b may collectively be referred to as a "client device 20". The client device 20 is not limited to the PC 20a and the smartphone 20b, but may be other information processing apparatuses, such as a workstation or a tablet terminal.

The image forming apparatus 30 is an apparatus, such as a printer or a multifunction peripheral (MFP), that interprets the PDL file received from the server system 10 and performs printout. The MFP is a multifunction peripheral having at least two of a copy function, a printer function, a scanner function, and a facsimile function. In the following descriptions, it is assumed that the image forming apparatus 30 is an MFP. Furthermore, while the single image forming apparatus 30 is illustrated in the example in FIG. 1, it may be possible to connect a plurality of the image forming apparatuses 30 to the network 2.

Hardware Configuration of Printing System

Next, hardware configurations of the apparatuses included in the printing system 1 will be described.

Hardware Configuration of Server System

Figure 2:
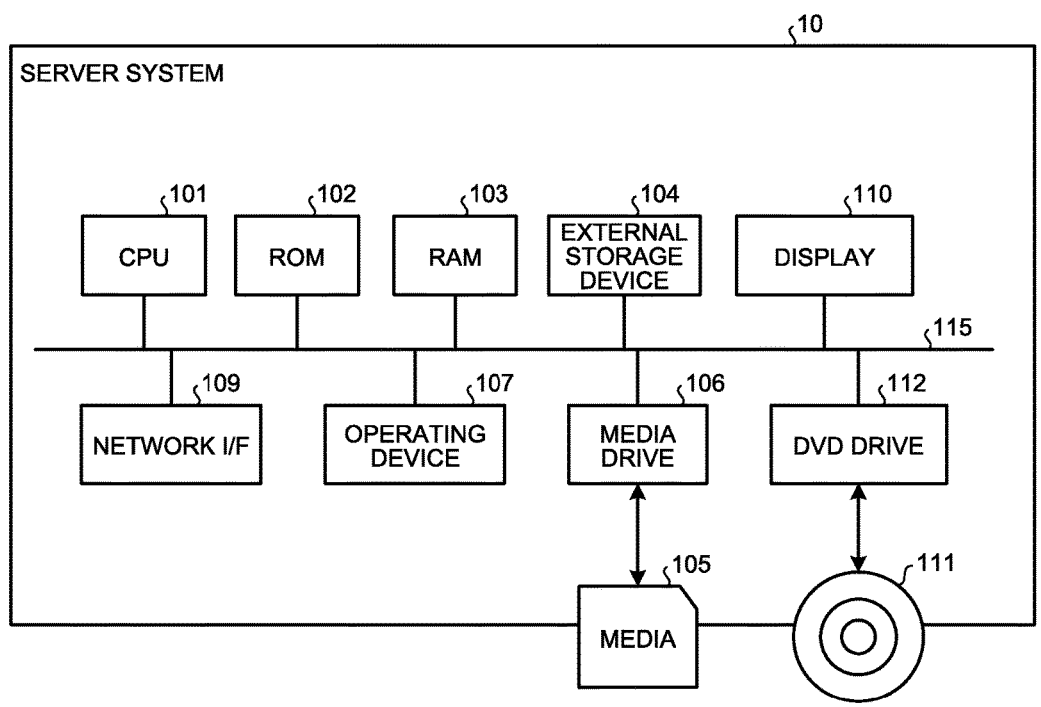
FIG. 2 is a diagram illustrating an example of a hardware configuration of a server system of the first embodiment.

FIG. 2 is a diagram illustrating an example of a hardware configuration of the server system of the first embodiment. With reference to FIG. 2, details of the hardware configuration of the server system 10 will be described.

As illustrated in FIG. 2, the server system 10 according to the first embodiment includes a central processing unit (CPU) 101, a read only memory (ROM) 102, a random access memory (RAM) 103, an external storage device 104, a media drive 106, an operating device 107, a network interface (I/F) 109, a display 110, and a digital versatile disc (DVD) drive 112.

The CPU 101 is an arithmetic device that controls operations of the entire server system 10. The ROM 102 is a non-volatile storage device that stores therein a program for the server system 10. The RAM 103 is a volatile storage device used as a work area of the CPU 101.

The external storage device 104 is a non-volatile storage device that stores therein various kinds of data, such as a document file received from the client device 20, a PDL file obtained by converting the document file to a PDL, and job information as information on a print job, as will be described later. The external storage device 104 is, for example, a hard disk drive (HDD), a solid state drive (SSD), or the like.

The media drive 106 is a device that controls read and write of data with respect to a media 105, such as a flash memory, under the control of the CPU 101. The media 105 is a storage device that is attachable to and detachable from the media drive 106. The media 105 is not limited to a flash memory as long as the media 105 is a non-volatile memory that reads and writes data under the control of the CPU 101, and may be an electrically erasable and programmable ROM (EEPROM) or the like.

The operating device 107 is an input device that inputs a character, a numeral, or the like, selects various kinds of instructions, and moves a cursor, for example. The operating device 107 is, for example, a mouse, a keyboard, or the like.

The network I/F 109 is an interface for performing data communication using the network 2. The network I/F 109 is, for example, a network interface card (NIC) compliant with a transmission control protocol/Internet protocol (TCP/IP), or the like.

The display 110 is a display device that displays a character, a numeral, various screens, an operation icon, and the like. The display 110 is, for example, a cathode ray tube (CRT) display, a liquid crystal display (LCD), an organic electro-luminescence (EL) display, or the like.

The DVD drive 112 is a device that controls read and write of data with respect to a digital versatile disc read only memory (DVD-ROM) 111 that is one example of a removable storage medium. As another example of the above-described removable recording medium, a computer-readable recording medium, such as a compact disc read only memory (CD-ROM), a compact disc recordable (CD-R), a digital versatile disc recordable (DVD-R), or a Blu-ray disc, may be used.

The CPU 101, the ROM 102, the RAM 103, the external storage device 104, the media drive 106, the operating device 107, the network I/F 109, the display 110, and the DVD drive 112 as described above are communicably connected to one another via a bus 115, such as an address bus or a data bus.

The program of the above-described server system 10 may be distributed by being recorded in a computer-readable recording medium (the media 105 or the like) in a computer-installable or computer-executable file format. Furthermore, the program of the above-described server system 10 may be stored in the ROM 102 or the external storage device 104 instead of the media 105.

Hardware Configuration of Client Device

Figure 3:
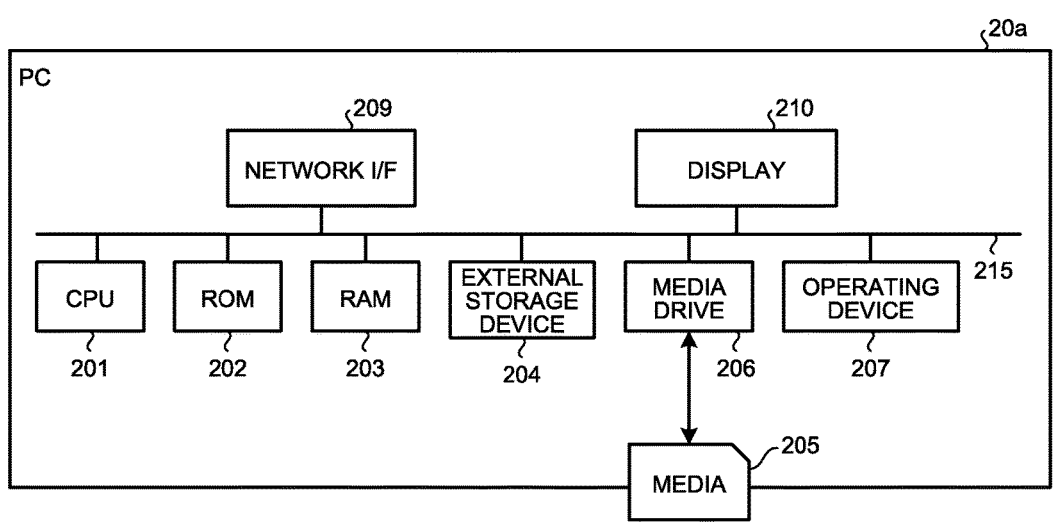
FIG. 3 is a diagram illustrating an example of a hardware configuration of a PC of the first embodiment.

FIG. 3 is a diagram illustrating an example of a hardware configuration of the PC of the first embodiment. With reference to FIG. 3, details of the hardware configuration of the PC 20a that is one example of the client device 20 will be described.

As illustrated in FIG. 3, the PC 20a according to the first embodiment includes a CPU 201, a ROM 202, a RAM 203, an external storage device 204, a media drive 206, an operating device 207, a network I/F 209, and a display 210.

The CPU 201 is an arithmetic device that controls operations of the entire PC 20a. The ROM 202 is a non-volatile storage device that stores therein a program for the PC 20a. The RAM 203 is a volatile storage device used as a work area of the CPU 201.

The external storage device 204 is a non-volatile storage device that stores therein various kinds of data. The external storage device 204 is, for example, an HDD, an SSD, or the like. The media drive 206 is a device that controls read and write of data with respect to a media 205, such as a flash memory, under the control of the CPU 201. The media 205 is a storage device that is attachable to and detachable from the media drive 206. The media 205 is not limited to a flash memory as long as the media 205 is a non-volatile memory that reads and writes data under the control of the CPU 201, and may be an EEPROM or the like.

The operating device 207 is an input device that inputs a character, a numeral, or the like, selects various kinds of instructions, and moves a cursor, for example. The operating device 207 is, for example, a mouse, a keyboard, or the like.

The network I/F 209 is an interface for performing data communication using the network 2. The network I/F 209 is, for example, a NIC compliant with a TCP/IP, or the like.

The display 210 is a display device that displays a character, a numeral, various screens, an operation icon, and the like. The display 210 is, for example, a CRT display, an LCD, an organic EL display, or the like.

The CPU 201, the ROM 202, the RAM 203, the external storage device 204, the media drive 206, the operating device 207, the network I/F 209, and the display 210 as described above are communicably connected to one another via a bus 215, such as an address bus or a data bus.

The program of the above-described PC 20a may be distributed by being recorded in a computer-readable recording medium (the media 205 or the like) in a computer-installable or computer-executable file format. Furthermore, the program of the above-described PC 20a may be stored in the ROM 202 or the external storage device 204 instead of the media 205.

Hardware Configuration of Image Forming Apparatus

Figure 4:
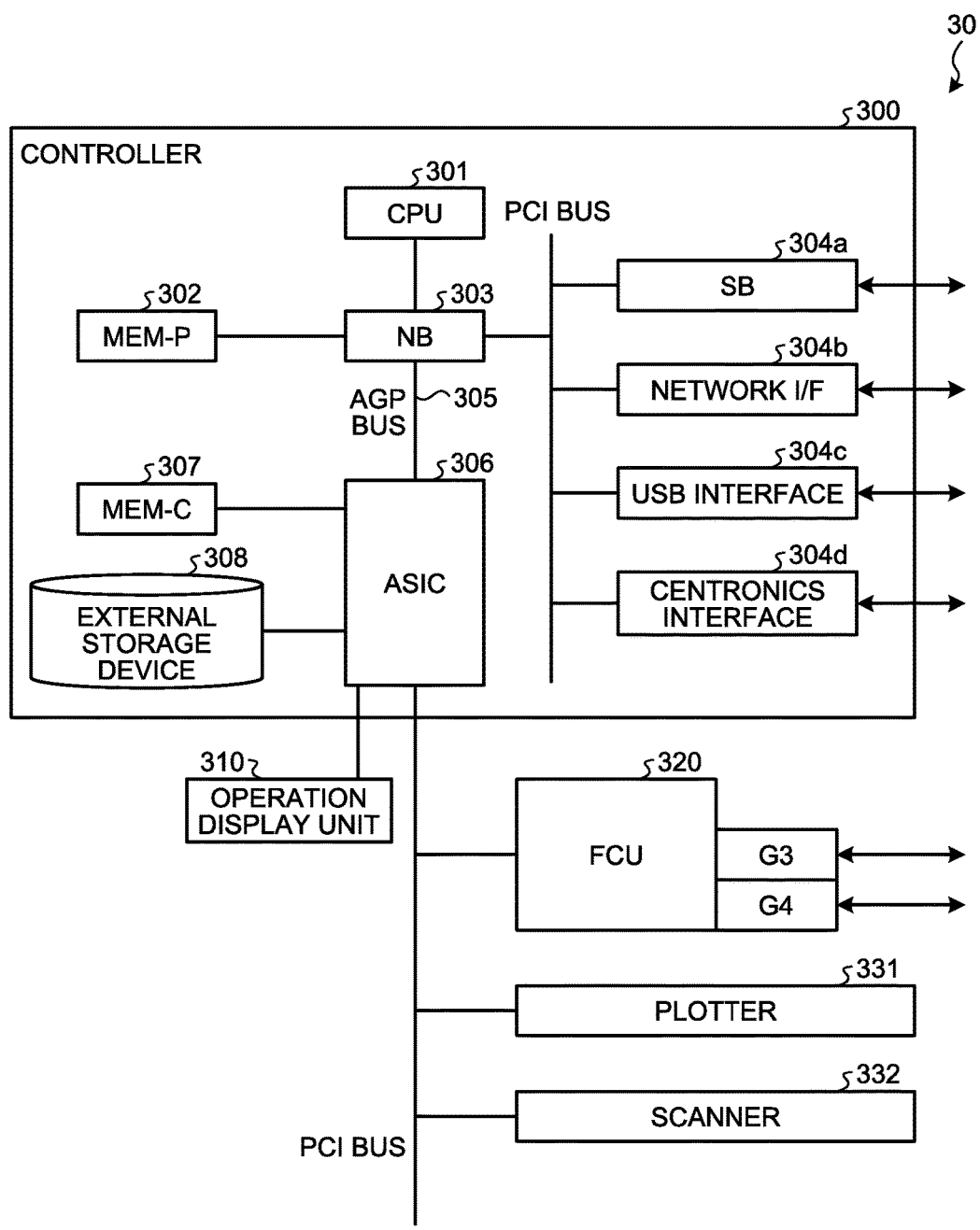
FIG. 4 is a diagram illustrating an example of a hardware configuration of an image forming apparatus of the first embodiment.

FIG. 4 is a diagram illustrating an example of a hardware configuration of the image forming apparatus of the first embodiment. With reference to FIG. 4, details of the hardware configuration of the image forming apparatus 30 will be described.

As illustrated in FIG. 4, the image forming apparatus 30 according to the first embodiment includes a controller 300, an operation display unit 310, a facsimile control unit (FCU) 320, a plotter 331, and a scanner 332, all of which are connected to one another via a peripheral component interface (PCI) bus.

The controller 300 is a device that controls the entire image forming apparatus 30, drawing, communication, and input from the operation display unit 310.

The operation display unit 310 is a device, such as a touch panel, that accepts input to the controller 300 and displays a state of the image forming apparatus 30 or the like. The operation display unit 310 is directly connected to an application specific integrated circuit (ASIC) 306 to be described later.

The FCU 320 is a device that implements a facsimile function, and is connected to the ASIC 306 via the PCI bus.

The plotter 331 is a device that implements a printing function, and is connected to the ASIC 306 via the PCI bus. The scanner 332 is a device that implements a scanner function, and is connected to the ASIC 306 via the PCI bus.

The controller 300 includes a CPU 301, a system memory (MEM-P) 302, a north bridge (NB) 303, a south bridge (SB) 304a, a network I/F 304b, a universal serial bus (USB) interface 304c, a Centronics interface 304d, the ASIC 306, a local memory (MEM-C) 307, and an external storage device 308.

The CPU 301 controls the entire image forming apparatus 30, is connected to a chipset including the system memory 302, the north bridge 303, and the south bridge 304a, and is connected to other apparatuses via the chipset.

The system memory 302 is used as a memory for storing a program and data, a memory for loading a program and data, a drawing memory for a printer, or the like, and includes a ROM and a RAM. The ROM is a read-only memory used as the memory for storing a program and data, and the RAM is a writable and readable memory used as the memory for loading a program and data, the drawing memory for a printer, or the like.

The north bridge 303 is a bridge to connect the CPU 301 to the system memory 302, the south bridge 304a, and an accelerated graphics port (AGP) bus 305, and includes a memory controller that controls read and write with respect to the system memory 302, a PCI master, and an AGP target.

The south bridge 304a is a bridge to connect the north bridge 303 to a PCI device and a peripheral device. The south bridge 304a is connected to the north bridge 303 via a PCI bus. The network I/F 304b, the USB interface 304c, the Centronics interface 304d, and the like are connected to the PCI bus.

The AGP bus 305 is a bus interface for a graphics accelerator card introduced to speed up graphics operations. The AGP bus 305 allows direct access to the system memory 302 with a high throughput, thereby speeding up the graphics accelerator card.

The ASIC 306 is an integrated circuit (IC) used for image processing including a hardware element for image processing. The ASIC 306 has a function as a bridge to connect the AGP bus 305, the PCI bus, the external storage device 308, and the local memory 307 to one another. The ASIC 306 includes the PCI target and the AGP master; an arbiter (ARB) that is the central core of the ASIC 306; a memory controller that controls the local memory 307; a plurality of direct memory access controllers (DMACs) that rotate image data by using hardware logic or the like; and a PCI unit that performs data transfer with the plotter 331 and the scanner 332 via the PCI bus. The FCU 320, the plotter 331, and the scanner 332 are connected to the ASIC 306 via the PCI bus. Furthermore, the ASIC 306 is connected to a host PC, a network, and the like (not illustrated).

The local memory 307 is a memory used as a copy image buffer and a code buffer.

The external storage device 308 is a storage device, such as an HDD, an SSD, a secure digital (SD) card, or a flash memory, and used to store image data, programs, font data, and forms.

Functional Block Configuration of Printing System

Figure 5:
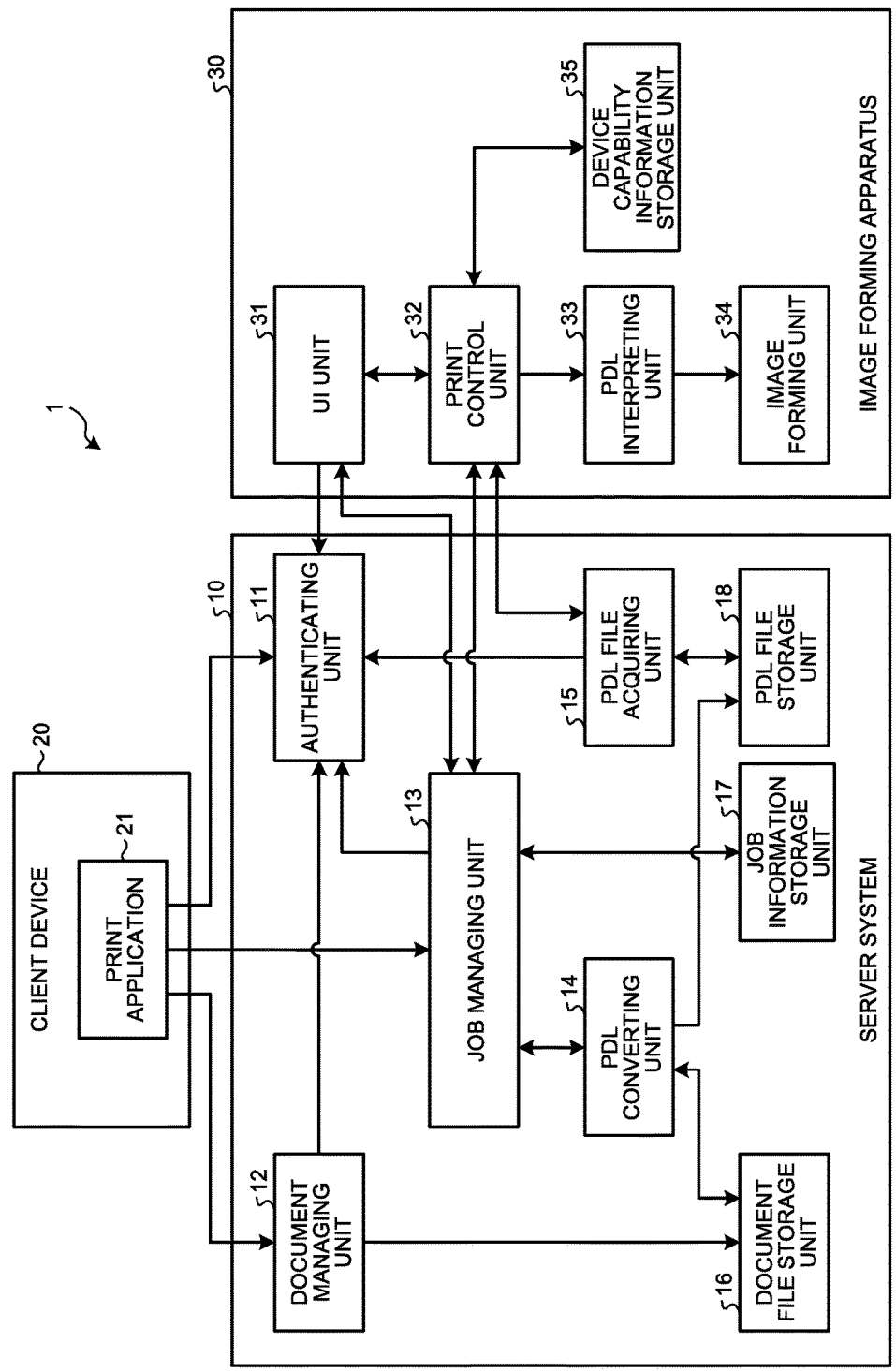
FIG. 5 is a diagram illustrating an example of a functional block configuration of the printing system according to the first embodiment.

FIG. 5 is a diagram illustrating an example of a functional block configuration of the printing system according to the first embodiment. With reference to FIG. 5, functional block configurations of the server system 10, the client device 20, and the image forming apparatus 30 in the printing system 1 according to the first embodiment will be described.

As illustrated in FIG. 5, the client device 20 includes a print application 21. The print application 21 is a functional unit that transmits a selected document file and a set print setting to the server system 10 and requests registration of a print job. The print application 21 is implemented by, for example, a program executed by the CPU 201 illustrated in FIG. 3.

The print application 21 of the client device 20 illustrated in FIG. 5 is functionally conceptual, and does not necessarily have to be configured in the same manner. For example, the function of the print application 21 of the client device 20 illustrated in FIG. 5 may be divided into a plurality of functions and implemented as a plurality of functional units.

Functional Configuration of Server System

As illustrated in FIG. 5, the server system 10 of the printing system 1 includes an authenticating unit 11, a document managing unit 12 (a first receiving unit), a job managing unit 13 (a second receiving unit, an estimating unit, a selecting unit, and a registering unit), a PDL converting unit 14 (a converting unit), a PDL file acquiring unit 15 (a transmitting unit), a document file storage unit 16, a job information storage unit 17 (a storage unit), and a PDL file storage unit 18.

The authenticating unit 11 is a functional unit that performs user authentication by using a user ID and a password transmitted from the client device 20. The authenticating unit 11 is implemented by, for example, a program executed by the CPU 101 illustrated in FIG. 2.

The document managing unit 12 is a functional unit that stores a document file received from the client device 20 in a storage area for each user in the document file storage unit 16, and transmits a document file uniform resource locator (URL) indicating the storage destination to the client device 20. The document managing unit 12 is implemented by, for example, a program executed by the CPU 101 illustrated in FIG. 2.

The job managing unit 13 is a functional unit that registers and updates information on a print job (job information) and estimates, based on a job history, a PDL to which a document file is converted. The job managing unit 13 is implemented by, for example, a program executed by the CPU 101 illustrated in FIG. 2.

The PDL converting unit 14 is a functional unit that converts a document file to a PDL indicated by a PDL type in a PDL conversion request received from the job managing unit 13. The PDL converting unit 14 is implemented by, for example, a program executed by the CPU 101 illustrated in FIG. 2.

The PDL file acquiring unit 15 is a functional unit that acquires a PDL file from the PDL file storage unit 18 in accordance with a PDL file request received from the image forming apparatus 30. The PDL file acquiring unit 15 is implemented by, for example, a program executed by the CPU 101 illustrated in FIG. 2.

The document file storage unit 16 is a functional unit that stores a document file in the storage area for each user. The job information storage unit 17 is a functional unit that stores job information (registers a job) in accordance with a print job submission request received from the client device 20. The PDL file storage unit 18 is a functional unit that stores the PDL file in the storage area for each user. The document file storage unit 16, the job information storage unit 17, and the PDL file storage unit 18 are implemented by the external storage device 104 illustrated in FIG. 2.

The authenticating unit 11, the document managing unit 12, the job managing unit 13, the PDL converting unit 14, the PDL file acquiring unit 15, the document file storage unit 16, the job information storage unit 17, and the PDL file storage unit 18 of the server system 10 illustrated in FIG. 5 are functionally conceptual, and do not necessarily have to be configured in the same manner. For example, a plurality of the functional units illustrated as independent units in the server system 10 in FIG. 5 may be configured as a single functional unit. Alternatively, a function of a single functional unit in the server system 10 illustrated in FIG. 5 may be divided into a plurality of functions and implemented as a plurality of functional units.

Furthermore, a part or all of the authenticating unit 11, the document managing unit 12, the job managing unit 13, the PDL converting unit 14, and the PDL file acquiring unit 15 may be implemented by a hardware circuit, such as a field-programmable gate array (FPGA) or an ASIC, instead of a software program.

Functional Configuration of Image Forming Apparatus

As illustrated in FIG. 5, the image forming apparatus 30 of the printing system 1 includes a user interface (UI) unit 31, a print control unit 32 (an example of a determining unit), a PDL interpreting unit 33, an image forming unit 34, and a device capability information storage unit 35.

The UI unit 31 is a functional unit that accepts various kinds of input operations performed by a user, displays a list of pieces of job information (a job list), and displays a job execution status, for example. The UI unit 31 is implemented by the operation display unit 310 and a program executed by the CPU 301 illustrated in FIG. 4.

The print control unit 32 is a functional unit that executes a job, that is, controls printing. The print control unit 32 is implemented by, for example, a program executed by the CPU 301 illustrated in FIG. 4.

The PDL interpreting unit 33 is a functional unit that interprets a PDL file received from the print control unit 32, and causes the image forming unit 34 to perform printout (form an image). The PDL interpreting unit 33 is implemented by, for example, a program executed by the CPU 301 illustrated in FIG. 4.

The image forming unit 34 is a functional unit that performs a printing operation to perform printout on a sheet (an image forming operation). The image forming unit 34 is implemented by the plotter 331 illustrated in FIG. 4.

The device capability information storage unit 35 is a functional unit that stores information on the capability of the image forming apparatus 30 (device capability information). The device capability information storage unit 35 is implemented by the external storage device 308 illustrated in FIG. 4 or the like.

Of the above-described functional units, for example, the UI unit 31 and the print control unit 32 are implemented by executing a script, such as JavaScript (registered trademark), which runs on a browser, or by executing a native application or the like installed in the image forming apparatus 30. In this case, JavaScript may be installed in the image forming apparatus 30 or may be executed by being downloaded from the server system 10 or the like. Furthermore, the PDL interpreting unit 33 is implemented by, for example, executing a native application or the like installed in the image forming apparatus 30.

The UI unit 31, the print control unit 32, the PDL interpreting unit 33, the image forming unit 34, and the device capability information storage unit 35 of the image forming apparatus 30 illustrated in FIG. 5 are functionally conceptual, and do not necessarily have to be configured in the same manner. For example, a plurality of the functional units illustrated as independent units in the image forming apparatus 30 in FIG. 5 may be configured as a single functional unit. Alternatively, a function of a single functional unit in the image forming apparatus 30 illustrated in FIG. 5 may be divided into a plurality of functions and implemented as a plurality of functional units.

Furthermore, a part or all of the print control unit 32 and the PDL interpreting unit 33 as described above may be implemented by a program executed by the CPU 301 illustrated in FIG. 4, or may be implemented by a hardware circuit (for example, the ASIC 306 or the like).

Job Submission Operation

Figure 6:
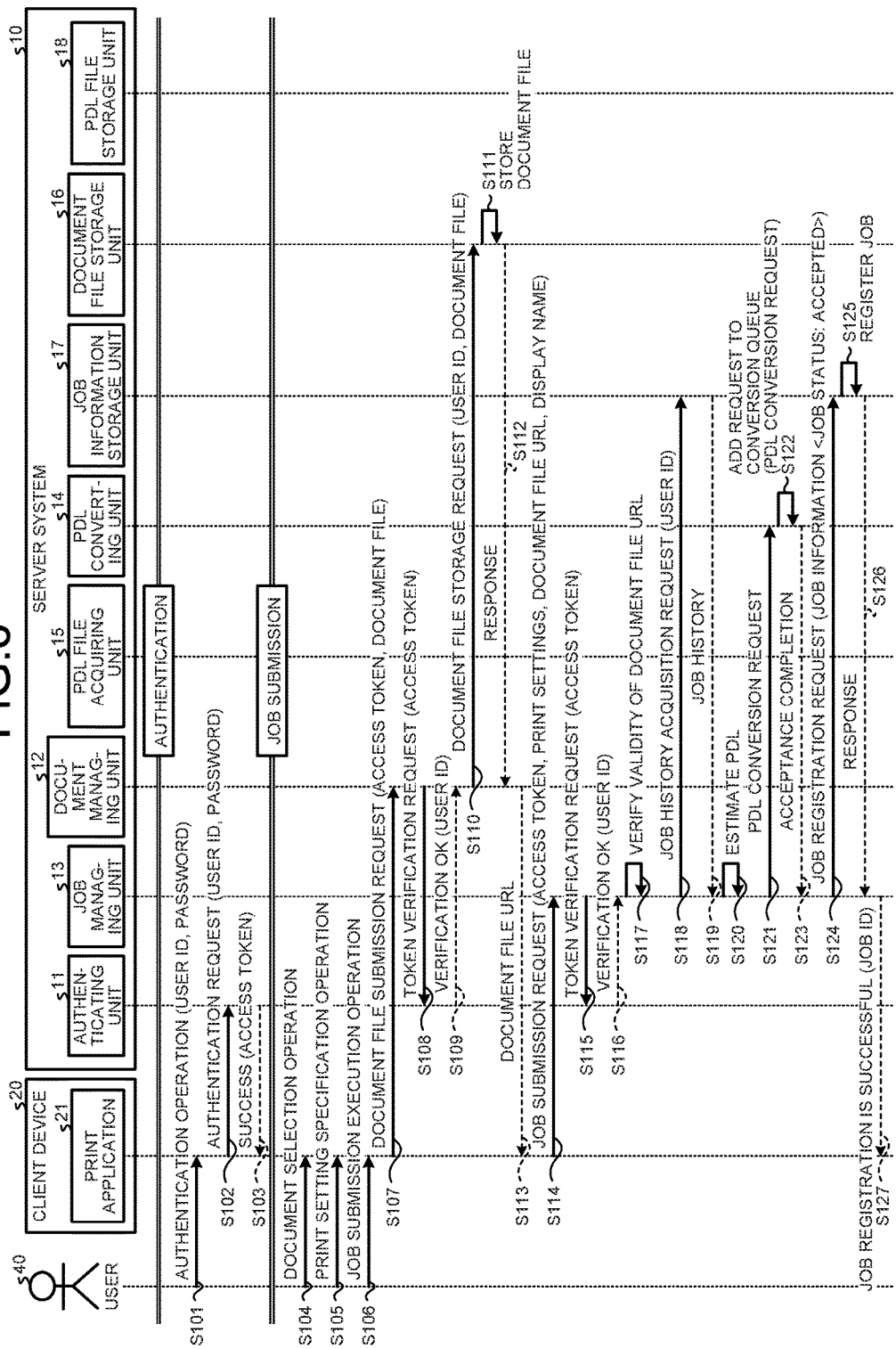
FIG. 6 is a sequence diagram illustrating an example of a job submission operation in the printing system according to the first embodiment.
Figure 7:
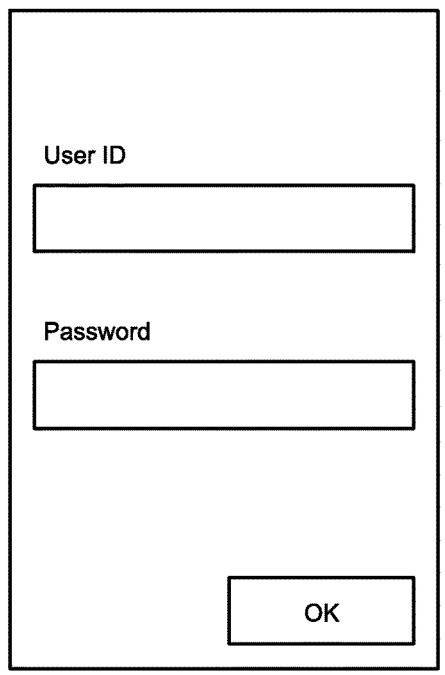
FIG. 7 is a diagram illustrating an example of an authentication screen of a client device according to the first embodiment.
Figure 8A:
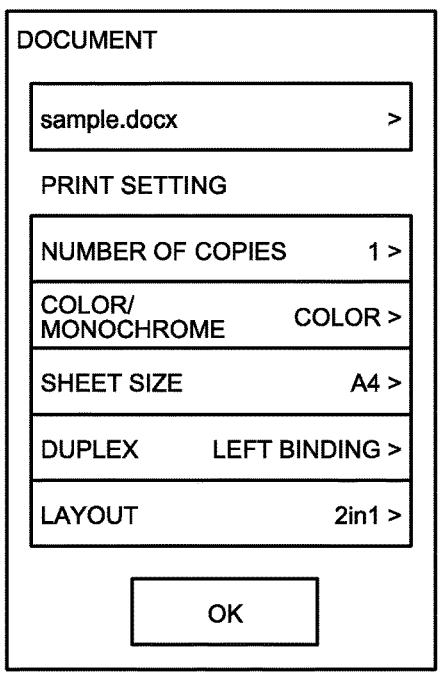
FIG. 8A is a diagram illustrating an example of a document selection/print setting screen of the client device according to the first embodiment.
Figure 8B:
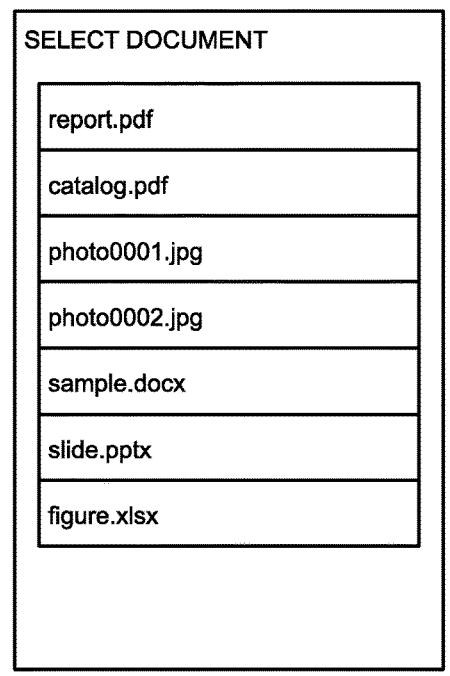
FIG. 8B is a diagram illustrating an example of a document selection/print setting screen of the client device according to the first embodiment.

FIG. 6 is a sequence diagram illustrating an example of a job submission operation in the printing system according to the first embodiment. FIG. 7 is a diagram illustrating an example of an authentication screen of the client device according to the first embodiment. FIG. 8 is a diagram illustrating an example of a document selection/print setting screen of the client device according to the first embodiment. FIG. 9 is a diagram illustrating an example of the job list. With reference to FIGS. 6 to 9, the job submission operation in the printing system 1 according to the first embodiment will be described.

Step S101

A user 40 performs an authentication operation of inputting a user ID and a password and then pressing an "OK" button in an authentication screen displayed on the display 210 of the client device 20 as illustrated in FIG. 7.

Step S102 The print application 21 of the client device 20 transmits an authentication request including the user ID and the password input by the user 40 to the authenticating unit 11 of the server system 10.

Step S103

Upon receiving the authentication request, the authenticating unit 11 performs an authentication process of verifying the validity of the received user ID and the received password, and transmits an authentication result to the print application 21 of the client device 20. In FIG. 6, the authenticating unit 11 transmits, as the authentication result, an access token indicating a success to the print application 21 of the client device 20.

The authentication process performed by the authenticating unit 11 is not limited to authentication using a user ID and a password as described above, but may be card authentication using an IC card or biometric authentication using a fingerprint, a retina, a vein, a face image, or the like, for example.

Steps S104 to S106

The user 40 performs, in the document selection/print setting screen as illustrated in FIG. 8(*a*) that is displayed on the display 210 of the client device 20, a job submission execution operation by selecting a document file desired to be printed from a document file list as illustrated in FIG. 8(*b*), setting various kinds of print settings, and pressing an OK button. Accordingly, the printing system 1 starts a job submission operation. In the example of the print setting illustrated in FIG. 8(*a*), the number of copies is set to "1", a color/monochrome setting is set to "color", a sheet size is set to "A4", a duplex setting is set to "left binding", and a layout setting is set to "2in1".

Step S107

The print application 21 transmits a document file submission request including the received access token and the selected document file to the document managing unit 12 of the server system 10. For example, when the print application 21 transmits the document file submission request by using a hypertext transfer protocol (HTTP), it may be possible to use a transmission method in which the access token is set in the Authorization header, a type of the document file is set in the Content-Type, and data of the document file is set in the body.

Step S108

Upon receiving the document file submission request, the document managing unit 12 sends a token verification request including the received access token to the authenticating unit 11.

Step S109

Upon receiving the token verification request, the authenticating unit 11 verifies the validity of the received access token, and sends a verification result to the document managing unit 12. As a verification method, for example, it may be possible to use a database in which a user ID is associated using an access token as a key, and determine that a certain access token is valid (verification is OK) when a user ID corresponding to the certain access token is retrieved by referring to the database. In FIG. 6, the authenticating unit 11 sends, as the verification result, information that indicates "verification OK" and that includes the user ID corresponding to the access token to the document managing unit 12.

Step S110

Upon receiving the information that indicates "verification OK" and includes the user ID, the document managing unit 12 sends a document file storage request including the user ID and the document file received at Step S107 to the document file storage unit 16.

Step S111

Upon receiving the document file storage request, the document file storage unit 16 stores the document file included in the document file storage request in a storage area that is set for each user ID included in the document file storage request. The storage area set for each user ID is configured to deny access based on a request other than the request to which the access token corresponding to the user ID is added.

Step S112

Upon storing the document file, the document file storage unit 16 returns a response indicating the storage of the document file to the document managing unit 12.

Step S113

Upon receiving the response, the document managing unit 12 transmits a document file URL indicating the storage destination of the document file in the document file storage unit 16 to the print application 21 of the client device 20. The document file URL includes, for example, a character string of "/user ID/file identifier/" at the end of the path thereof. This makes it possible to identify a user who is an owner of the document file from the document file URL. As a method for identifying a user from the document file URL, it may be possible to use a database in which a user ID is associated using an identifier of a document file as a key.

Step S114

Upon receiving the document file URL, the print application 21 transmits a job submission request including the document file URL, the access token received at Step S103, the print settings set at Step S105, and a job display name for display on the UI unit 31 of the image forming apparatus 30 to the job managing unit 13 of the server system 10. For example, when the print application 21 transmits the job submission request by using an HTTP, it may be possible to use a transmission method in which the access token is set in the Authorization header and other parameters are written in the body in a JavaScript object notation (JSON) format.

Step S115

Upon receiving the job submission request, the job managing unit 13 sends a token verification request including the received access token to the authenticating unit 11.

Step S116

Upon receiving the token verification request, the authenticating unit 11 verifies the validity of the received access token, and sends a verification result to the job managing unit 13. In FIG. 6, the authenticating unit 11 sends, as the verification result, information that indicates "verification OK" and that includes the user ID corresponding to the access token to the job managing unit 13.

Step S117

The job managing unit 13 verifies the validity of the document file URL received at Step S114. Specifically, the job managing unit 13 compares the user ID included in the verification result sent from the authenticating unit 11 with the user ID included in the document file URL, and determines that the document file URL is received from a valid user when the user IDs are identical.

Step S118

The job managing unit 13 sends a job history acquisition request including the user ID to the job information storage unit 17 in order to estimate a PDL to which the document file identified by the document file URL is converted.

Step S119

Upon receiving the job history acquisition request, the job information storage unit 17 reads a history of pieces of job information (a job history) corresponding to the user ID included in the job history acquisition request from the stored list of pieces of job information (a job list).

FIG. 9 illustrates an example of the job list. The job list illustrated in FIG. 9 is a list of pieces of job information A to F for a user ID "user1". As illustrated in FIG. 9, a piece of job information includes pieces of information, such as an "id" as a job ID for uniquely identifying a job, a "user" as a user ID for uniquely identifying a user who has submitted the job, a "status" indicating a job execution status (job status) (to be described later with reference to FIG. 12), a "pdl_type" as a type of a PDL for conversion, a "display_name" as a job display name to be displayed on the UI unit 31 of the image forming apparatus 30, a "date" as a job registration date and time, a "config" indicating a print setting for the job, a "document_url" as a URL of a document file to be printed by the job, and a "pdl_url" as a URL of a PDL file.

For example, in the job list illustrated in FIG. 9, it is indicated that the job information B includes an id of "BBBBBBBB", a user of "user1", a status of "completed", a pdl_type of "pdl1", a display_name of "Print Job B", a date of "2016-01-10 T08:56:23.067Z", a config of "{copies:1, colormode:mono, size:a4, duplex:none, layout:none}", a documet_url of "https://xxxxxxx.com/docs/user1/1hjdowdz.jpg", and a pdl_url of "https://xxxxxxx.com/pdls/user1/jdyrnfly".

Furthermore, the job managing unit 13 can request, by the job history acquisition request, acquisition of a job history from the job list stored in the job information storage unit 17 by specifying a user ID, a job status, and the number of pieces of information to be acquired. Here, for example, it is assumed that the job managing unit 13 sends the job history acquisition request to the job information storage unit 17 by specifying "user1" as the user ID, "completed" as the job status (indicating that execution of the job is completed as will be described later with reference to FIG. 12), and "3" as the number of pieces of information to be acquired. Therefore, the job information storage unit 17 reads, from the job list illustrated in FIG. 9, the pieces of the job information B, D, and E that include the job IDs (id) of "BBBBBBBB", "DDDDDDDD", and "EEEEEEEE", respectively. The job managing unit 13 may request acquisition of a job history by specifying a range of the registration dates and times by the job history acquisition request, instead of specifying the number of pieces of information to be acquired. Furthermore, the job managing unit 13 may request acquisition of a job history by specifying a predetermined number of pieces of information in order from the newest registration date and time by the job history acquisition request.

The job information storage unit 17 sends the read job information as a job history to the job managing unit 13.

Step S120

The job managing unit 13 estimates, based on the received job history, a type of a PDL to which the document file that is stored in the document file storage unit 16 at Step S111 is converted. For example, when the job managing unit 13 receives the job history including the pieces of the job information B, D, and E as illustrated in FIG. 9 as described above, PDL types corresponding to the pieces of the job information are "pdl1", "pdl2", and "pdl1", respectively; therefore, the job managing unit 13 estimates the most frequently used "pdl1" to be the type of the PDL to which the document file is converted.

While the job managing unit 13 performs estimation based on a PDL type that is most frequently used in the acquired job history as described above, the present invention is not limited to this example. For example, the job managing unit 13 may perform estimation based on a PDL type of a piece of job information with the newest registration date and time among the pieces of the job information included in the acquired job history, or may calculate a reference value related to the use frequency by assigning a greater weight to a PDL type of a piece of job information with a newer registration date and time and perform estimation based a PDL type with the greatest reference value.

Step S121

Upon completing the estimation of the PDL type, the job managing unit 13 sends a PDL conversion request including a job ID for uniquely identifying a piece of job information to be newly registered, the user ID included in the verification result sent from the authenticating unit 11, the estimated PDL type, the print settings received at Step S114, and the verified document file URL to the PDL converting unit 14 in order to convert the document file to the estimated PDL.

Step S122

The PDL converting unit 14 adds the received PDL conversion request to a conversion queue.

Step S123

Upon adding the PDL conversion request to the conversion queue, the PDL converting unit 14 returns a response indicating acceptance completion to the job managing unit 13.

Step S124

Upon receiving the response indicating acceptance completion from the PDL converting unit 14, the job managing unit 13 sends a job registration request including the pieces of the information that are included in the PDL conversion request at Step S121 (the job ID, the user ID, the PDL type, the print settings, and the document file URL), a job status in which "accepted" is specified, a registration date and time in which a current date and time are specified, and a job display name to the job information storage unit 17 in order to add the piece of the job information as a new job in the job list in the job information storage unit 17.

Step S125

Upon receiving the job registration request, the job information storage unit 17 registers (stores), in the job list, a piece of new job information containing the pieces of the information included in the job registration request. At this time, a PDL file URL of the piece of the registered job information is blank.

Step S126

Upon registering the piece of the new job information in the job list, the job information storage unit 17 returns a response indicating the registration to the job managing unit 13.

Step S127

Upon receiving the response, the job managing unit 13 transmits information that includes the job ID of the piece of the registered new job information and that indicates a success of the job registration to the print application 21. The print application 21 may display the received information indicating a success of the job registration on the display 210, for example.

Through Steps S101 to S127 as described above, the job submission operation is performed in the printing system 1. If the PDL converting unit 14 immediately performs PDL conversion without queueing upon receiving the PDL conversion request, it takes a long time to perform a conversion process and it may become impossible to return a response indicating job registration to the print application 21, so that the request may be timed out or the print application 21 may suspend a response for a long time, which leads to the reduced convenience of a user. However, in the first embodiment, as described above, a document file associated with the PDL conversion request that has been sent from the job managing unit 13 to the PDL converting unit 14 is not immediately converted to a PDL, but is added to the conversion queue. With this operation, it becomes possible to prevent the above-described problems. Meanwhile, it does not mean to exclude an operation of immediately performing the PDL conversion without queueing the PDL conversion request. That is, the PDL converting unit 14 may immediately convert a corresponding document file to a PDL upon receiving the PDL conversion request. In this case, the print application 21 can recognize not only that the job is registered but also that a document file related to the job is normally converted to a PDL.

Furthermore, while the job managing unit 13 estimates the PDL type based on the job history at Step S120, the number of PDL types to be estimated is not limited to one. It may be possible to estimate a plurality of PDL types. For example, the job managing unit 13 may refer to the job history and select a predetermined number of PDL types as estimation targets in order from the highest use frequency. In this case, as will be described later, the PDL converting unit 14 converts the document file to a plurality of estimated PDLs.

PDL Conversion Operation

Figure 11:
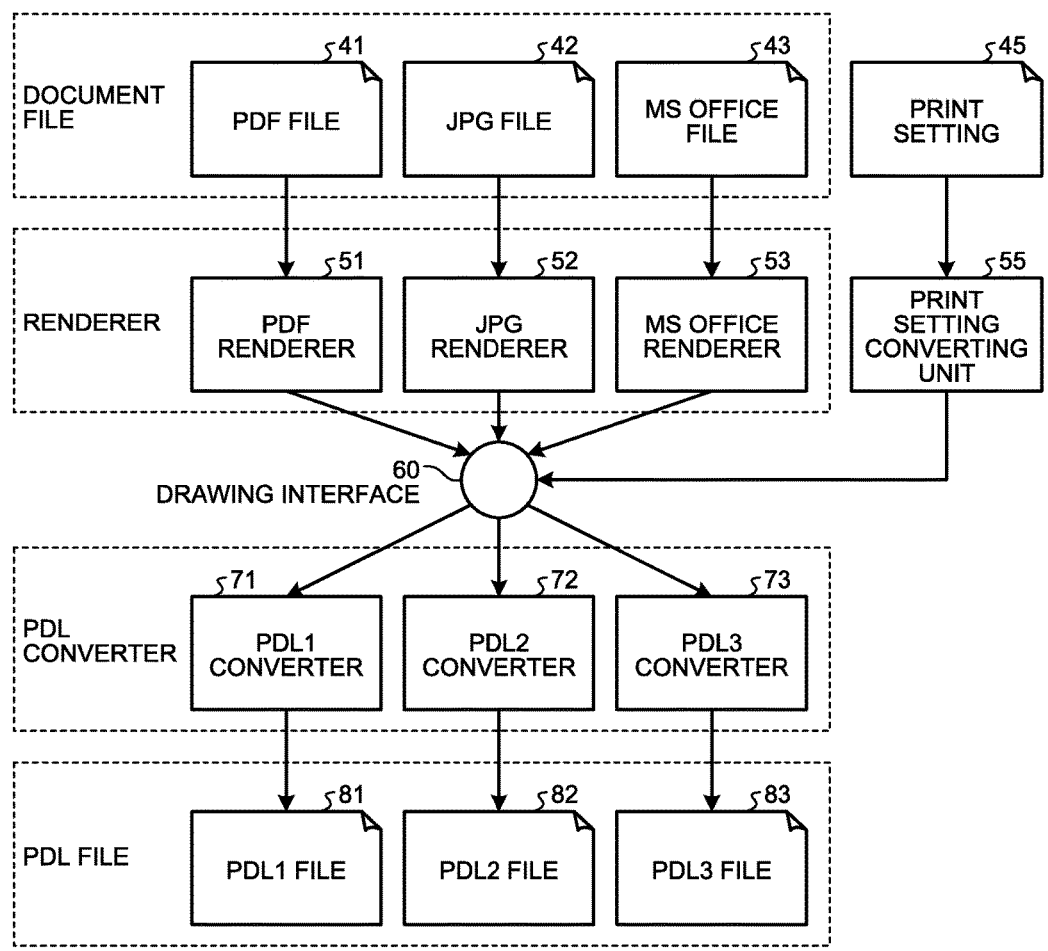
FIG. 11 is a diagram illustrating an example of a configuration for implementing PDL conversion in a server system according to the first embodiment.
Figure 12:
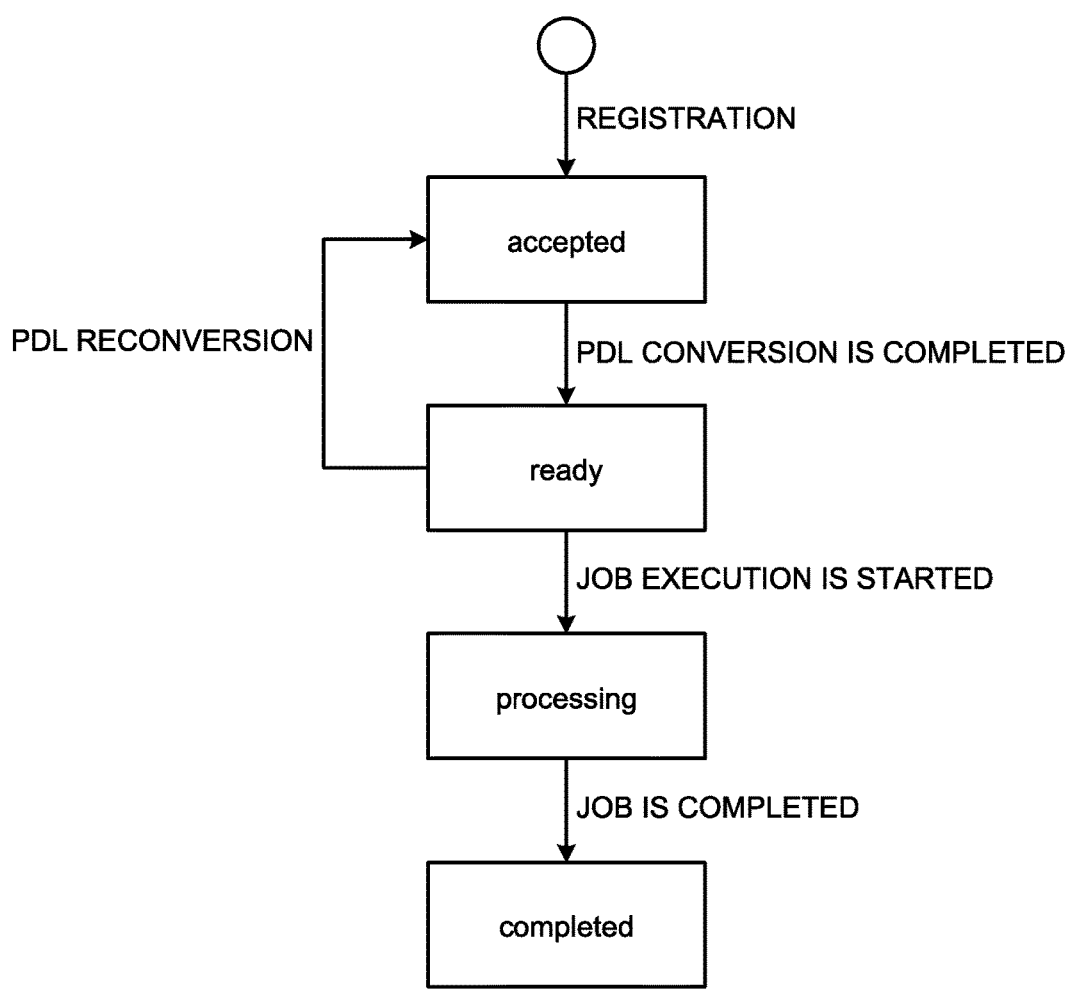
FIG. 12 is a diagram illustrating job status transition.

FIG. 10 is a sequence diagram illustrating an example of a PDL conversion operation in the printing system according to the first embodiment. FIG. 11 is a diagram illustrating an example of a configuration for implementing PDL conversion in the server system according to the first embodiment. FIG. 12 is a diagram illustrating job status transition. With reference to FIGS. 10 to 12, the PDL conversion operation performed by the printing system 1 according to the first embodiment will be described.

Step S201

The PDL converting unit 14 of the server system 10 retrieves a top PDL conversion request that is added to the conversion queue at Step S122 in FIG. 6 as described above. That is, input and output of the PDL conversion request with respect to the conversion queue is performed in the first-in first-out (FIFO) method.

Step S202

The PDL converting unit 14 sends a document file acquisition request including the document file URL included in the retrieved PDL conversion request to the document file storage unit 16.

Step S203

Upon receiving the document file acquisition request, the document file storage unit 16 reads a document file from a storage area specified by the document file URL included in the document file acquisition request. The document file storage unit 16 then sends the read document file to the PDL converting unit 14.

Step S204

Upon receiving the document file, the PDL converting unit 14 converts the document file to the estimated PDL by using the print settings included in the PDL conversion request. In this case, a conversion process from the document file to the PDL performed by the PDL converting unit 14 is executed as, for example, a background process behind basic operations (job registration, preparation for execution, or the like) performed by the server system 10.

With reference to FIG. 11, a functional configuration for converting the document file to the PDL (hereinafter, referred to as a PDL conversion configuration) will be described below. As illustrated in FIG. 11, the document file includes various kinds of files, such as a portable document format (PDF) file, a joint photographic experts group (JPG) file, a portable network graphics (PNG) file, and a Microsoft (MS) Office (registered trademark) file. To convert the above-described files to a printable data format, a renderer corresponding to each of the data formats is needed.

As illustrated in FIG. 11, the PDL conversion configuration includes a renderer, a print setting converting unit 55, a drawing interface 60, and a PDL converter.

The renderer is a program that converts a document file to a drawing command for the drawing interface 60. Substance of the renderer may be an application for displaying and editing a document file in each data format, or a library for rendering. Examples of the renderer include, as illustrated in FIG. 11, a PDF renderer 51 corresponding to a PDF file 41, a JPG renderer 52 corresponding to a JPG file 42, and an MS Office renderer 53 corresponding to an MS Office file 43. These renderers perform conversion to print data through the common drawing interface 60.

The print setting converting unit 55 is a program that converts print setting 45 to a drawing command for the drawing interface 60. A PrintTicket scheme or the like is generally used.

The drawing interface 60 is an interface that supports a data format, such as text, graphics, or an image, and is a graphics device interface (GDI), an XML paper specification (XPS), or the like in the case of Windows (registered trademark). The PDL converter is a program called through the common drawing interface 60, and substance thereof is a printer driver or a library for conversion to a PDL. The PDL converter generates a PDL file by converting a data format, such as text, graphics, or an image, to a PDL format that can be interpreted by the image forming apparatus 30. Examples of the PDL converter include, as illustrated in FIG. 11, a PDL1 converter 71 that generates a PDL1 file 81 through conversion to a PDL1 format, a PDL2 converter 72 that generates a PDL2 file 82 through conversion to a PDL2 format, and a PDL3 converter 73 that generates a PDL3 file 83 through conversion to a PDL3 format, which are converters that performs conversion to the respective PDLs.

The PDL converting unit 14 is implemented by executing a program that has functions for addition to the conversion queue at Step S122 in FIG. 6 as described above, retrieval from the conversion queue at Step S201 in FIG. 10, acquisition of the document file at Step S202, and the PDL conversion as the PDL converter at Step S204.

Step S205

The PDL converting unit 14 sends a PDL file storage request including the converted PDL file and the user ID included in the PDL conversion request to the PDL file storage unit 18.

Step S206

Upon receiving the PDL file storage request, the PDL file storage unit 18 stores the PDL file included in the PDL file storage request in a storage area that is set for each user ID included in the PDL file storage request. The storage area set for each user ID is configured to deny access based on a request other than the request to which the access token corresponding to the user ID is added.

Step S207

Upon storing the PDL file, the PDL file storage unit 18 returns a response indicating the storage of the PDL file to the PDL converting unit 14.

Step S208

Upon receiving the response, the PDL converting unit 14 sends a conversion completion notice including the PDL file URL that indicates the storage destination of the PDL file in the PDL file storage unit 18 and the job ID that is included in the PDL conversion request to the job managing unit 13. The PDL file URL includes, for example, a character string of "/user ID/file identifier/" at the end of the path thereof. This makes it possible to identify a user who is an owner of the PDL file from the PDL file URL. As a method for identifying a user from the PDL file URL, it may be possible to use a database in which a user ID is associated using an identifier of a PDL file as a key.

The notice of completion of the PDL conversion may be provided to the print application 21 of the client device 20. With this operation, the user can recognize that the document file corresponding to the registered job has been converted to the PDL file, and can recognize a timing at which printing can be performed.

Step S209

Upon receiving the conversion completion notice, the job managing unit 13 sends a job status update request including the PDL file URL and a job status in which "ready" is specified to the job information storage unit 17 in order to update, in the job list in the job information storage unit 17, the job information identified by the job ID included in the PDL conversion request.

Step S210

Upon receiving the job status update request, the job information storage unit 17 sets, in the corresponding job information, the PDL file URL included in the job status update request, and updates the job status from "accepted" to "ready".

With reference to FIG. 12, status transition of the job status in the job information will be described below. As illustrated in FIG. 6, when the job submission operation is performed and new job information is registered, the job status of the job information is set to "accepted" as illustrated in FIG. 12. Subsequently, as illustrated in FIG. 10, when the document file is converted to the PDL and the PDL file is stored, the job status of the corresponding job information is changed from "accepted" to "ready" as illustrated in FIG. 12. Then, as will be described later with reference to FIG. 13, when execution of the job is started, the job status of the corresponding job information is changed from "ready" to "processing" as illustrated in FIG. 12. Furthermore, as will be described later with reference to FIG. 13, when the job is completed, the job status of the corresponding job information is changed from "processing" to "completed" as illustrated in FIG. 12. Moreover, as will be described later with reference to FIG. 18, even when the conversion to the estimated PDL is performed once and the job status is changed to "ready", if the estimation is not correct, the job status is changed from "ready" to "accepted" again in order to perform conversion to a different PDL as illustrated in FIG. 12.

Step S211

The job information storage unit 17 returns a response indicating that the update is performed in response to the job status update request to the job managing unit 13.

Through Steps S201 to S211 as described above, the PDL conversion operation is performed in the printing system 1. As described above with reference to FIG. 10, the print application 21 of the client device 20 is notified of only registration of a job, and a document file corresponding to the registered job is converted to a PDL file as a background process.

Job Execution Operation when Estimation is Successful

Figure 13:
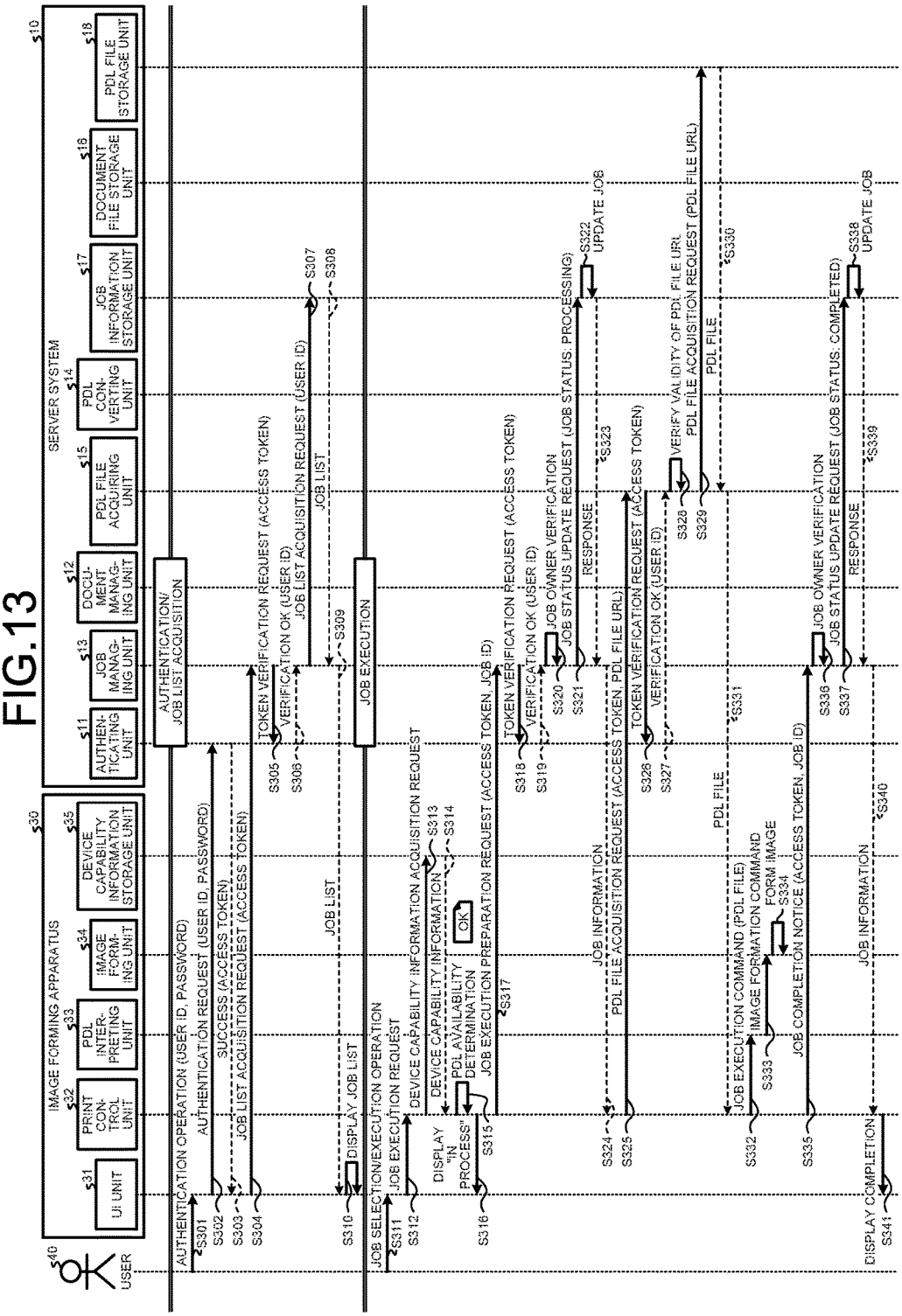
FIG. 13 is a sequence diagram illustrating an example of a job execution operation performed when PDL estimation is successful in the printing system according to the first embodiment.
Figure 14:
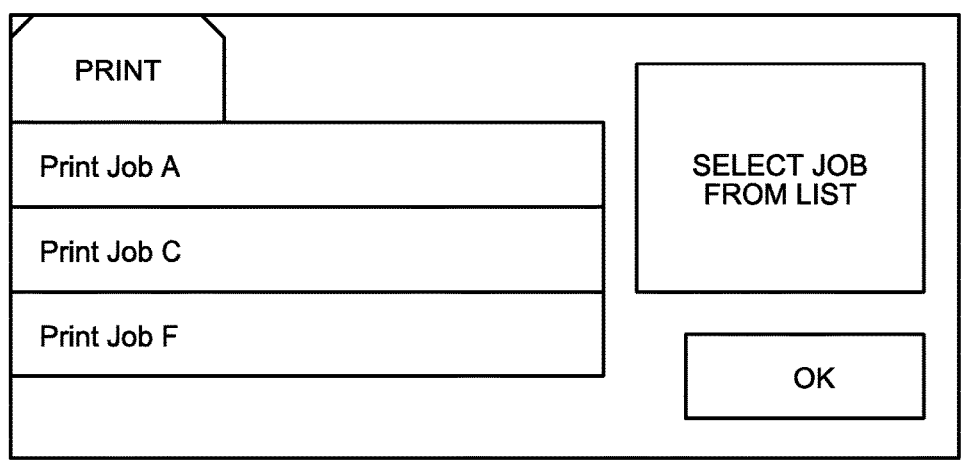
FIG. 14 is a diagram illustrating an example of a job selection/execution screen of the image forming apparatus according to the first embodiment.
Figure 15:
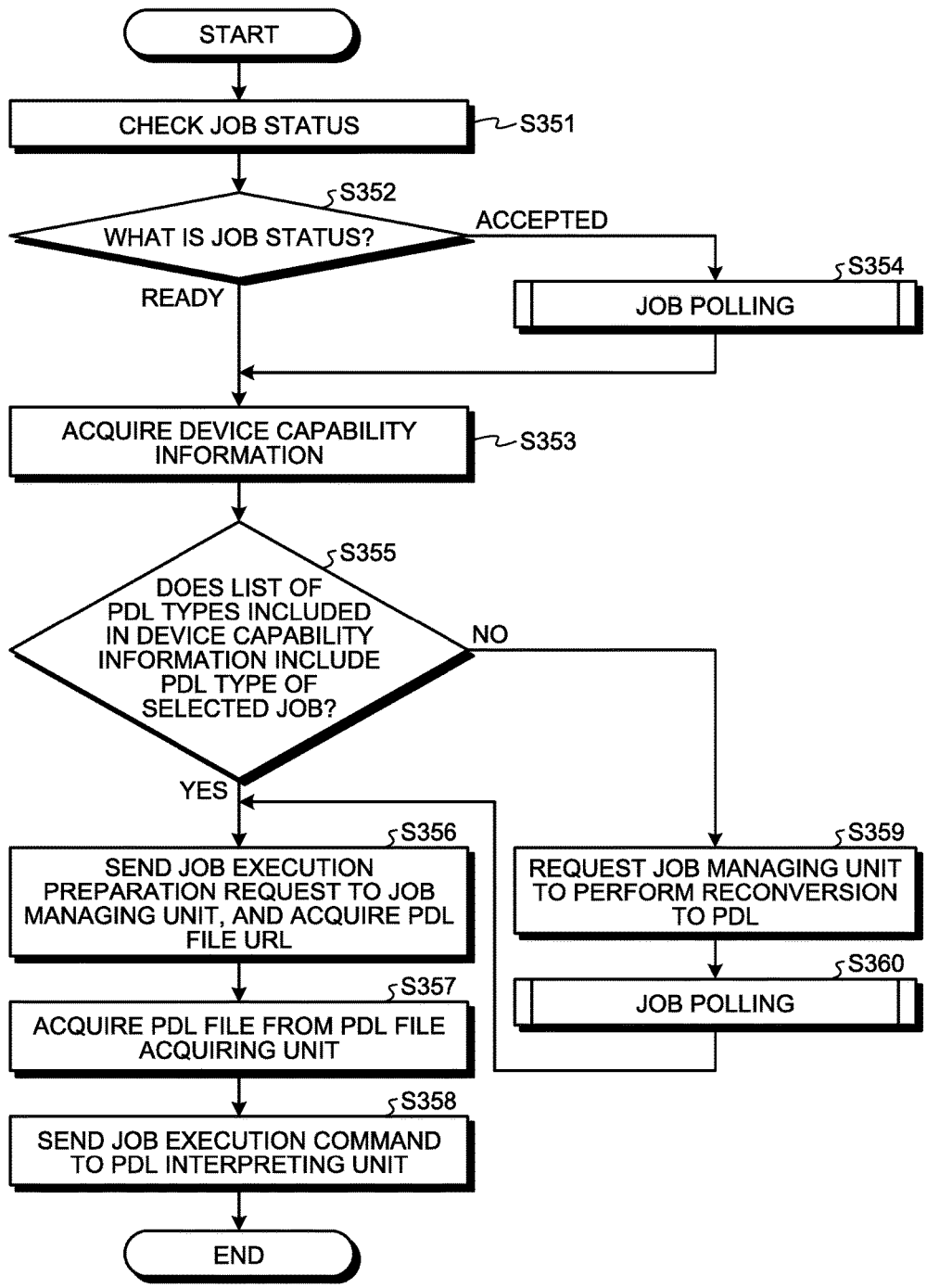
FIG. 15 is a flowchart illustrating an overview of the job execution operation in the printing system according to the first embodiment.
Figure 16:
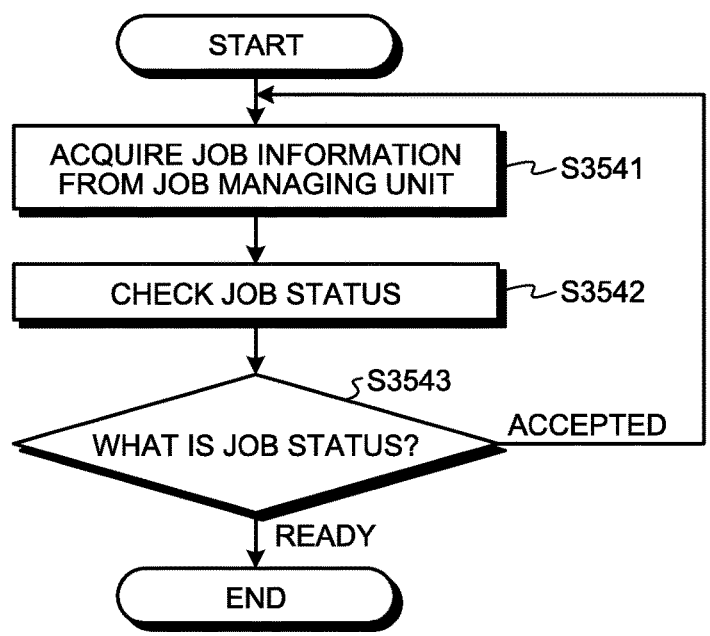
FIG. 16 is a flowchart illustrating an example of a job polling operation in the printing system according to the first embodiment.
Figure 17:
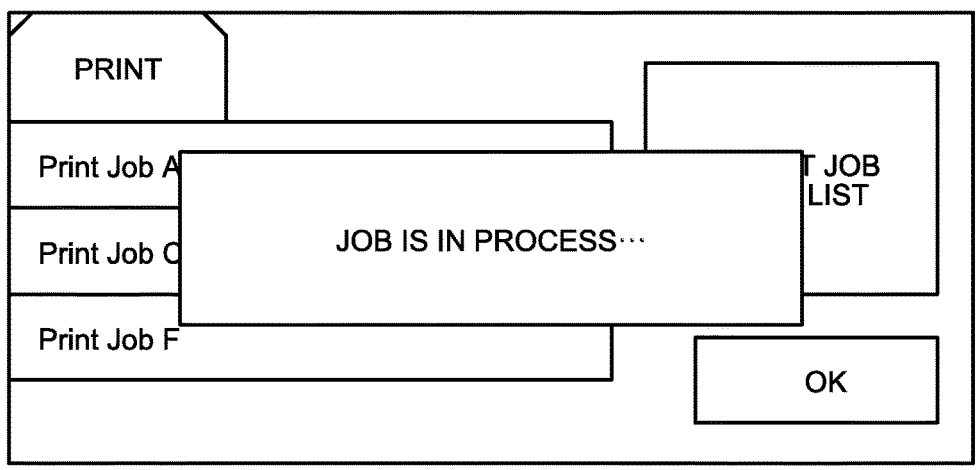
FIG. 17 is a diagram illustrating an example of a screen indicating that a job is in process in the image forming apparatus according to the first embodiment.

FIG. 13 is a sequence diagram illustrating an example of a job execution operation performed when PDL estimation is successful in the printing system according to the first embodiment. FIG. 14 is a diagram illustrating an example of a job selection/execution screen of the image forming apparatus according to the first embodiment. FIG. 15 is a flowchart illustrating an overview of the job execution operation in the printing system according to the first embodiment. FIG. 16 is a flowchart illustrating an example of a job polling operation in the printing system according to the first embodiment. FIG. 17 is a diagram illustrating an example of a screen indicating that a job is in process in the image forming apparatus according to the first embodiment. With reference to FIGS. 13 to 17, the job execution operation performed when the PDL estimation is successful in the printing system 1 according to the first embodiment will be described.

Step S301

The user 40 performs an authentication operation of inputting a user ID and a password and then pressing an "OK" button in an authentication screen (for example, the authentication screen as illustrated in FIG. 7) displayed on the UI unit 31 of the image forming apparatus 30.

Step S302

The UI unit 31 of the image forming apparatus 30 transmits an authentication request including the user ID and the password input by the user 40 to the authenticating unit 11 of the server system 10.

Step S303

Upon receiving the authentication request, the authenticating unit 11 performs an authentication process of verifying the validity of the received user ID and the received password, and transmits an authentication result to the UI unit 31 of the image forming apparatus 30. In FIG. 13, the authenticating unit 11 transmits, as the authentication result, an access token indicating a success to the UI unit 31 of the image forming apparatus 30.

The authentication process performed by the authenticating unit 11 is not limited to authentication using a user ID and a password as described above, but may be card authentication using an IC card or biometric authentication using a fingerprint, a retina, a vein, a face image, or the like, for example.

Step S304

The UI unit 31 transmits a job list acquisition request including the access token to the job managing unit 13 of the server system 10 in order to acquire a job list.

Step S305

Upon receiving the job list acquisition request, the job managing unit 13 sends a token verification request including the received access token to the authenticating unit 11.

Step S306

Upon receiving the token verification request, the authenticating unit 11 verifies the validity of the received access token, and sends a verification result to the job managing unit 13. The verification method is the same as the method described at Step S109 in FIG. 6. In FIG. 13, the authenticating unit 11 sends, as the verification result, information that indicates "verification OK" and that includes the user ID corresponding to the access token to the job managing unit 13.

Step S307

The job managing unit 13 sends a job list acquisition request, which requests a list of pieces of job information that correspond to the received user ID and that have job statuses of "accepted" or "ready" from the job list in the job information storage unit 17, and which includes the received user ID, to the job information storage unit 17. The reason why pieces of job information with the job statuses of "completed" and "processing" are excluded from the job information to be requested is to prevent the same job from being executed simultaneously by a plurality of image forming apparatuses because a job with the job status of "completed" is already completed and a job with the job status of "processing" is already being processed in a different image forming apparatus.

Step S308

Upon receiving the job list acquisition request, the job information storage unit 17 reads a list of pieces of job information that correspond to the user ID included in the job list acquisition request and that have the job statuses of "accepted" or "ready" from the stored job list. The job information storage unit 17 then sends the read job list to the job managing unit 13.

Steps S309 and S310

The job managing unit 13 transmits the received job list to the UI unit 31 of the image forming apparatus 30. The UI unit 31 displays the received job list as in the job selection/execution screen as illustrated in FIG. 14.

Step S311

The user 40 performs a job selection/execution operation of selecting a job to be executed, that is, a job for performing printout (image formation), and then pressing an OK button in the job selection/execution screen displayed on the UI unit 31 as illustrated in FIG. 14.

Step S312

The UI unit 31 sends a job execution request to execute the selected job to the print control unit 32. Here, it is assumed that the job status of the selected job is "ready".

Steps S313 and S314

Upon receiving the job execution request, the print control unit 32 sends a device capability information acquisition request to acquire device capability information including a list of PDL types available for the image forming apparatus 30 to the device capability information storage unit 35. Upon receiving the device capability information acquisition request, the device capability information storage unit 35 reads the device capability information and sends the device capability information to the print control unit 32.

Step S315

Upon receiving the device capability information, the print control unit 32 determines whether the list of the available PDL types included in the device capability information includes a PDL type included in the job information on the job selected at Step S311 (PDL availability determination). In FIG. 13, it is assumed that the print control unit 32 determines that, as a result of the PDL availability determination, the list of the available PDL types included in the device capability information includes the PDL type included in the job information on the job selected at Step S311, that is, the PDL estimation performed by the job managing unit 13 at Step S120 in FIG. 6 as described above is successful.

Step S316

The print control unit 32 displays a screen for notifying the user 40 that the job is in process on the UI unit 31 as illustrated in FIG. 17.

Step S317

When determining that the PDL estimation performed by the job managing unit 13 is successful as a result of the PDL availability determination, the print control unit 32 transmits a job execution preparation request including the job ID of the job selected at Step S311 and the access token acquired by the UI unit 31 to the job managing unit 13 of the server system 10.

Step S318

Upon receiving the job execution preparation request, the job managing unit 13 sends a token verification request including the received access token to the authenticating unit 11.

Step S319

Upon receiving the token verification request, the authenticating unit 11 verifies the validity of the received access token, and sends a verification result to the job managing unit 13. The verification method is the same as the method described at Step S109 in FIG. 6. In FIG. 13, the authenticating unit 11 sends, as the verification result, information that indicates "verification OK" and that includes the user ID corresponding to the access token to the job managing unit 13.

Step S320

The job managing unit 13 performs owner verification of the job identified by the job ID included in the job execution preparation request. Specifically, the job managing unit 13 compares the user ID included in the verification result sent from the authenticating unit 11 with the user ID included in the job information identified by the job ID included in the job execution preparation request, and determines that an owner of the job is valid when the user IDs are identical.

Step S321

When determining that the owner of the job is valid, the job managing unit 13 sends a job status update request for specifying "processing" as the job status to the job information storage unit 17 in order to update, in the job list in the job information storage unit 17, the job information identified by the job ID included in the job execution preparation request.

Step S322

Upon receiving the job status update request, the job information storage unit 17 updates the job status of the corresponding job information from "ready" to "processing" in accordance with the specification in the job status update request.

Step S323

The job information storage unit 17 returns a response indicating that the update is performed in response to the job status update request to the job managing unit 13.

Step S324

The job managing unit 13 transmits the job information, which corresponds to the user ID corresponding to the access token and whose job status has been updated to "processing", to the print control unit 32 of the image forming apparatus 30.

Step S325

The print control unit 32 transmits a PDL file acquisition request including the access token and the PDL file URL included in the received job information to the PDL file acquiring unit 15 of the server system 10.

Step S326

Upon receiving the PDL file acquisition request, the PDL file acquiring unit 15 sends a token verification request including the access token included in the PDL file acquisition request to the authenticating unit 11.

Step S327

Upon receiving the token verification request, the authenticating unit 11 verifies the validity of the received access token, and sends a verification result to the PDL file acquiring unit 15. The verification method is the same as the method described at Step S109 in FIG. 6. In FIG. 13, the authenticating unit 11 sends, as the verification result, information that indicates "verification OK" and that includes the user ID corresponding to the access token to the PDL file acquiring unit 15.

Step S328

The PDL file acquiring unit 15 verifies the validity of the PDL file URL received at Step S325. Specifically, the PDL file acquiring unit 15 compares the user ID included in the verification result sent from the authenticating unit 11 with the user ID included in the PDL file URL, and determines that the PDL file URL is sent from a valid user when the user IDs are identical.

Step S329

The PDL file acquiring unit 15 sends a PDL file acquisition request including the PDL file URL determined as having been received from the valid user to the PDL file storage unit 18.

Step S330

Upon receiving the PDL file acquisition request, the PDL file storage unit 18 reads a PDL file from a storage area specified by the PDL file URL included in the PDL file acquisition request. The PDL file storage unit 18 then sends the read PDL file to the PDL file acquiring unit 15.

Step S331

The PDL file acquiring unit 15 transmits the received PDL file to the print control unit 32 of the image forming apparatus 30.

Steps S332 to S334

The print control unit 32 sends a job execution command including the received PDL file to the PDL interpreting unit 33. The PDL interpreting unit 33 interprets the received PDL file, and sends an image formation command to cause the image forming unit 34 to perform printout (image formation) to the image forming unit 34. Upon receiving the image formation command, the image forming unit 34 performs a printing operation (image forming operation) of printing the contents of the PDL file interpreted by the PDL interpreting unit 33 on a sheet.

Step S335

The print control unit 32 transmits a job completion notice including the access token and the job ID of the job that has been completed to the job managing unit 13 of the server system 10.

Step S336

The job managing unit 13 performs owner verification of the job identified by the job ID included in the job completion notice. Specifically, the job managing unit 13 compares the user ID included in the verification result sent from the authenticating unit 11 at Step S319 with the user ID included in the job information identified by the job ID included in the job completion notice, and determines that an owner of the job is valid when the user IDs are identical.

Step S337

When determining that the owner of the job is valid, the job managing unit 13 sends a job status update request for specifying "completed" as the job status to the job information storage unit 17 in order to update, in the job list in the job information storage unit 17, the job information identified by the job ID included in the job completion notice.

Step S338

Upon receiving the job status update request, the job information storage unit 17 updates the job status of the corresponding job information from "processing" to "completed" in accordance with the specification in the job status update request.

Step S339

The job information storage unit 17 returns a response indicating that the update is performed in response to the job status update request to the job managing unit 13.

Step S340

The job managing unit 13 transmits the job information, which corresponds to the user ID corresponding to the access token and whose job status has been updated to "completed", to the print control unit 32 of the image forming apparatus 30.

Step S341

The print control unit 32 displays a screen for notifying the user 40 that the execution of the job is completed on the UI unit 31.

Through Steps S301 to S341 as described above, the job execution operation is performed in the printing system 1 when the PDL estimation is successful. With reference to FIGS. 15 and 16, an operation for executing a job will be described in detail below.

Steps S351 and S352

Upon receiving the job execution request from the UI unit 31, the print control unit 32 checks whether the job status in the job information on the job selected on the UI unit 31 is "ready" or "accepted". If the job status is "ready" (READY at Step S352), the process proceeds to Step S353. If the job status is "accepted" (ACCEPTED at Step S352), the process proceeds to Step S354.

Step S353

If the job status in the job information on the job selected on the UI unit 31 is "ready", the print control unit 32 acquires, from the device capability information storage unit 35, the device capability information including a list of PDL types available for the image forming apparatus 30. Then, the process proceeds to Step S355.

Step S354

If the job status in the job information on the job selected on the UI unit 31 is "accepted", the print control unit 32 determines that the document file corresponding to the job information has not yet been converted to a PDL, and performs a job polling operation as illustrated in FIG. 16 until the job status is changed to "ready". With reference to FIG. 16, the job polling operation will be described in detail below.

Step S3541

The print control unit 32 acquires (receives) latest job information on the job selected on the UI unit 31 from the job managing unit 13 of the server system 10.

Steps S3542 and S3543

The print control unit 32 checks the job status from the acquired job information. If the job status remains "accepted" (ACCEPTED at Step S3543), the process returns to Step S3541. If the job status is "ready" (READY at Step S3543), the job polling operation ends. Then, the process proceeds to Step S353 in FIG. 15, the explanation of which will be continued below.

Step S355

The print control unit 32 determines whether the list of the available PDL types included in the acquired device capability information includes a PDL type included in the job information on the selected job (the PDL availability determination). If the list of the available PDL types included in the device capability information includes the PDL type (YES at Step S355), the process proceeds to Step S356. If the list of the available PDL types included in the device capability information does not include the PDL type (NO at Step S355), the process proceeds to Step S359.

Step S356

When determining that the list of the available PDL types included in the device capability information includes the PDL type included in the job information on the selected job, the print control unit 32 transmits a job execution preparation request including the job ID of the selected job or the like to the job managing unit 13 of the server system 10. Upon receiving the job execution preparation request, the job managing unit 13 updates the job status of the job ID included in the job execution preparation request to "processing", and transmits the job information corresponding to the job ID to the print control unit 32. Here, the job information includes the PDL file URL.

Step S357

The print control unit 32 transmits a PDL file acquisition request including the PDL file URL included in the received job information or the like to the PDL file acquiring unit 15 of the server system 10. The PDL file acquiring unit 15 acquires a PDL file from a storage area specified by the PDL file URL in the PDL file storage unit 18. The PDL file acquiring unit 15 transmits the acquired PDL file to the print control unit 32 of the image forming apparatus 30. Then, the process proceeds to Step S358.

Step S358

The print control unit 32 sends a job execution command including the received PDL file to the PDL interpreting unit 33. The PDL interpreting unit 33 interprets the received PDL file, and sends an image formation command to cause the image forming unit 34 to perform printout (image formation) to the image forming unit 34. Upon receiving the image formation command, the image forming unit 34 performs a printing operation (image forming operation) of printing the contents of the PDL file interpreted by the PDL interpreting unit 33 on a sheet.

Step S359

When determining that the list of the available PDL types included in the device capability information does not include the PDL type included in the job information on the selected job, the print control unit 32 transmits a PDL reconversion request for requesting reconversion to a different PDL to the job managing unit 13 of the server system 10. Then, the process proceeds to Step S360.

Step S360

The print control unit 32 performs the job polling operation similarly to the process at Step S354. If the job status of the job information to be re-converted is changed to "ready", the process proceeds to Step S356.

Through Steps S351 to S360 as described above, the job execution operation is performed. The operations at Steps S351 to S358 correspond to the operations at Steps S312 to S334 in FIG. 13, respectively. The operations at Steps S359 and S360 correspond to operations at Steps S407 to S435 in FIG. 18, respectively, which will be described later.

Job Execution Operation when Estimation has Failed

Figure 18:
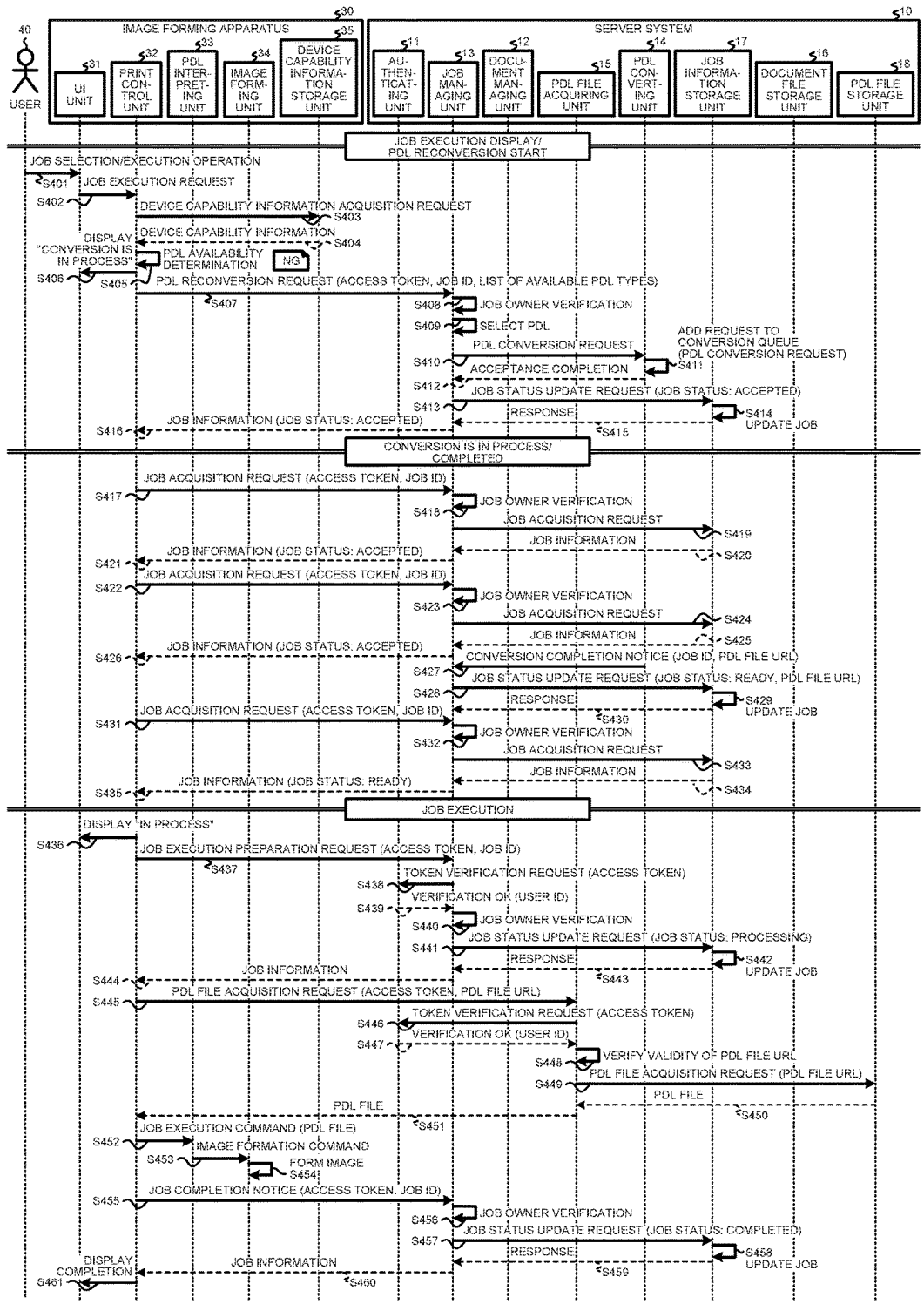
FIG. 18 is a sequence diagram illustrating an example of a job execution operation performed when the PDL estimation has failed in the printing system according to the first embodiment.
Figure 19:
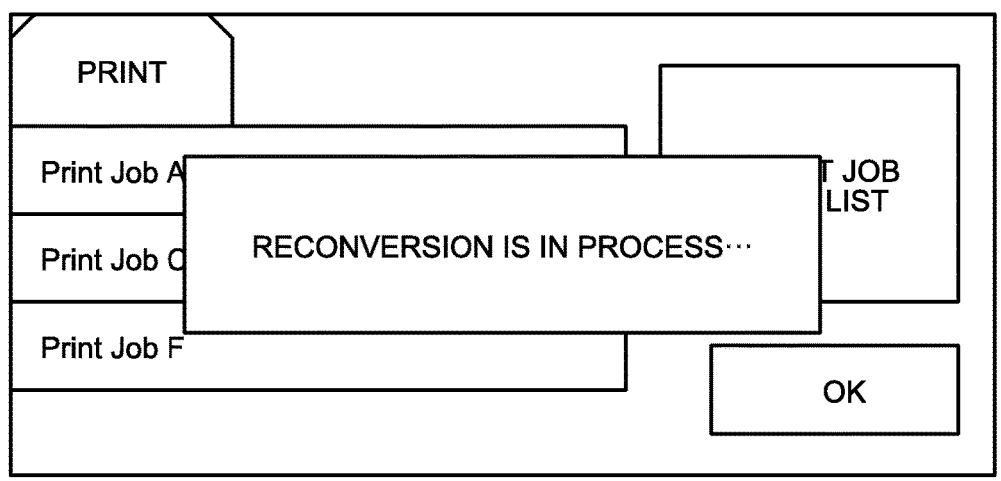
FIG. 19 is a diagram illustrating an example of a screen indicating that PDL reconversion is in process in the image forming apparatus according to the first embodiment.

FIG. 18 is a sequence diagram illustrating an example of a job execution operation performed when the PDL estimation has failed in the printing system according to the first embodiment. FIG. 19 is a diagram illustrating an example of a screen indicating that PDL reconversion is in process in the image forming apparatus according to the first embodiment. With reference to FIGS. 18 and 19, the job execution operation performed when the PDL estimation has failed in the printing system 1 according to the first embodiment will be described. It is assumed that the operations at Steps S301 to S310 in FIG. 13 are performed in advance.

Steps S401 to S404

The processes at Steps S401 to S404 are the same as the processes at Steps S311 to S314 in FIG. 13, respectively.

Step S405

Upon receiving the device capability information, the print control unit 32 determines whether the list of the available PDL types included in the device capability information includes a PDL type included in the job information on the job selected at Step S401 (the PDL availability determination). In FIG. 18, it is assumed that the print control unit 32 determines that, as a result of the PDL availability determination, the list of the available PDL types included in the device capability information does not include the PDL type included in the job information on the job selected at Step S401, that is, the PDL estimation performed by the job managing unit 13 at Step S120 in FIG. 6 as described above has failed.

Step S406

The print control unit 32 displays a screen for notifying the user 40 that the reconversion is in process on the UI unit 31 as illustrated in FIG. 19 because it is necessary to re-convert the document file corresponding to the job selected at Step S401 to a PDL included in the list of the available PDL types included in the device capability information on the image forming apparatus 30.

Step S407

When determining that the PDL estimation performed by the job managing unit 13 has failed as a result of the PDL availability determination, the print control unit 32 transmits a PDL reconversion request including the job ID selected at Step S401, the access token acquired by the UI unit 31, and the list of the available PDL types included in the device capability information to the job managing unit 13 of the server system 10.

Step S408

The job managing unit 13 performs owner verification of the job identified by the job ID included in the received PDL reconversion request. The verification method is the same as the method described at Step S320 in FIG. 13.

Step S409

The job managing unit 13 compares the list of the available PDL types included in the received PDL reconversion request with a list of PDL types available for conversion performed by the PDL converting unit 14, and selects a PDL type included in both of the lists. Specifically, the job managing unit 13 may select an arbitrary PDL type from among the PDL types included in both of the lists, or may select a PDL type in order of priority that is determined in advance for the PDL types, for example. Furthermore, when a PDL type is selected in order of priority, it may be possible to select the PDL type by referring to a table in which the PDL types and the order of priority are associated, for example. The job managing unit 13 does not necessarily have to select the PDL type, but the print control unit 32 may specify a PDL compliant with the image forming apparatus 30 and cause the job managing unit 13 to select the PDL type.

Step S410

Upon completing the selection of the PDL type, the job managing unit 13 sends a PDL conversion request including the job ID included in the PDL reconversion request, the user ID included in the verification result sent from the authenticating unit 11, and the selected PDL type to the PDL converting unit 14 in order to convert the document file to the selected PDL.

Step S411

The PDL converting unit 14 adds the received PDL conversion request to a conversion queue. In this case, the PDL converting unit 14 adds the PDL conversion request to the conversion queue such that the PDL conversion request related to reconversion is preferentially processed.

Step S412

Upon adding the PDL conversion request to the conversion queue, the PDL converting unit 14 returns a response indicating acceptance completion to the job managing unit 13.

Step S413

Upon receiving the response indicating acceptance completion from the PDL converting unit 14, the job managing unit 13 sends a job status update request for specifying "accepted" as the job status to the job information storage unit 17 in order to update, in the job list in the job information storage unit 17, the job information identified by the job ID included in the PDL conversion request.

Step S414

Upon receiving the job status update request, the job information storage unit 17 updates the job status of the corresponding job information from "ready" to "accepted" in accordance with the specification in the job status update request.

Step S415

The job information storage unit 17 returns a response indicating that the update is performed in response to the job status update request to the job managing unit 13.

Step S416

Upon receiving the response indicating the update, the job managing unit 13 transmits the job information, which corresponds to the user ID corresponding to the access token and whose job status has been updated to "accepted", to the print control unit 32 of the image forming apparatus 30.

Step S417

The print control unit 32 transmits a job acquisition request including the access token acquired by the UI unit 31 and the job ID included in the PDL reconversion request to the job managing unit 13 of the server system 10.

Step S418

The job managing unit 13 performs owner verification of the job identified by the job ID included in the received job acquisition request. The verification method is the same as the method described at Step S320 in FIG. 13.

Steps S419 and S420

The job managing unit 13 sends the job acquisition request including the job ID to the job information storage unit 17. Upon receiving the job acquisition request, the job information storage unit 17 reads job information corresponding to the job ID included in the job acquisition request from the stored job list, and sends the job information to the job managing unit 13.

Step S421

The job managing unit 13 transmits the received job information to the print control unit 32 of the image forming apparatus 30. In this example, it is assumed that the print control unit 32 confirms that the job status of the received job information remains "accepted" and the document file corresponding to the job information has not yet been converted to the PDL selected at Step S409.

Step S422

The print control unit 32 transmits a job acquisition request including the access token acquired by the UI unit 31 and the job ID included in the PDL reconversion request to the job managing unit 13 of the server system 10 again.

Steps S423 to S426

The processes at Steps S423 to S426 are the same as the processes at Steps S418 to S421, respectively.

Step S427

Here, it is assumed that the PDL converting unit 14 of the server system 10 preferentially performs the same processes as the processes at Steps S201 to S207 in FIG. 10 on the PDL conversion request that has been added to the conversion queue at Step S411, and sends, to the job managing unit 13, a conversion completion notice indicating that the document file corresponding to the job ID included in the job acquisition request received from the print control unit 32 has been converted to the selected PDL. The conversion completion notice includes the PDL file URL indicating a storage destination of the PDL file in the PDL file storage unit 18 and the job ID included in the PDL conversion request received from the job managing unit 13.

Step S428

Upon receiving the conversion completion notice, the job managing unit 13 sends a job status update request that includes the PDL file URL and a job status in which "ready" is specified to the job information storage unit 17 in order to update, in the job list in the job information storage unit 17, the job information identified by the job ID included in the PDL conversion request.

Step S429

Upon receiving the job status update request, the job information storage unit 17 sets, in the corresponding job information, the PDL file URL included in the job status update request, and updates the job status from "accepted" to "ready".

Step S430

The job information storage unit 17 returns a response indicating that the update is performed in response to the job status update request to the job managing unit 13.

Step S431

The print control unit 32 transmits a job acquisition request including the access token acquired by the UI unit 31 and the job ID included in the PDL reconversion request to the job managing unit 13 of the server system 10 again.

Steps S432 to S434

The processes at Steps S432 to S434 are the same as the processes at Steps S418 to S420, respectively.

Step S435

The job managing unit 13 transmits the received job information to the print control unit 32 of the image forming apparatus 30. The print control unit 32 confirms that the job status of the received job information has been updated to "ready" and the document file corresponding to the job information has been converted to the PDL selected at Step S409.

Steps S436 to S461

The processes at Steps S436 to S461 are the same as the processes at Steps S316 to S341 in FIG. 13, respectively.

Through Steps S401 to S461 as described above, the job execution operation is performed in the printing system 1 when the PDL estimation has failed.

As described above, in the printing system 1 according to the first embodiment, when a job is submitted to print a certain document file, a PDL used for conversion is estimated from a past job history of a user of the document file. Then, the PDL converting unit 14 of the server system 10 converts the document file to the estimated PDL through a background process. If the PDL estimation is successful, the image forming apparatus 30 requests execution of the job, acquires a PDL file that has already been converted to the estimated PDL, and then performs printout (image formation). In this manner, when the server system 10 converts, in advance, a document file to a PDL that is estimated from a job history of a user, when the server system 10 determines an apparatus for performing printout and then executes a job, and if the PDL estimation is successful, it is possible to perform printout without performing the PDL conversion process again. Therefore, it is possible to reduce a time taken from determination of the apparatus that performs printout to execution of printing.

In contrast, when the PDL estimation has failed, a PDL that is available for an apparatus for performing printout and that is available for conversion performed by the PDL converting unit 14 is selected and then reconversion is performed, so that the image forming apparatus 30 can perform printout based on the converted PDL file. Therefore, a configuration that enables printout is ensured even when the PDL estimation has failed.

Furthermore, when the PDL estimation has failed, the PDL converting unit 14 preferentially retrieves a PDL conversion request related to reconversion from a conversion queue, and converts the document file to the selected PDL. Therefore, even when the PDL estimation has failed, reconversion to the PDL is promptly performed, and a time taken before execution of printing can be reduced.

Second Embodiment

With regard to a printing system according to a second embodiment, a difference from the printing system 1 according to the first embodiment will be mainly described below. In the first embodiment, an operation in which the image forming apparatus 30 performs the PDL availability determination has been described. In the second embodiment, an operation in which a server system performs the PDL availability determination will be described. The entire configuration of a printing system and hardware configurations of a server system, a PC, and an image forming apparatus according to the second embodiment are the same as the configurations described in the first embodiment. Furthermore, a job submission operation and a PDL conversion operation in the printing system according to the second embodiment are the same as the operations described in the first embodiment.

Functional Block Configuration of Printing system

Figure 20:
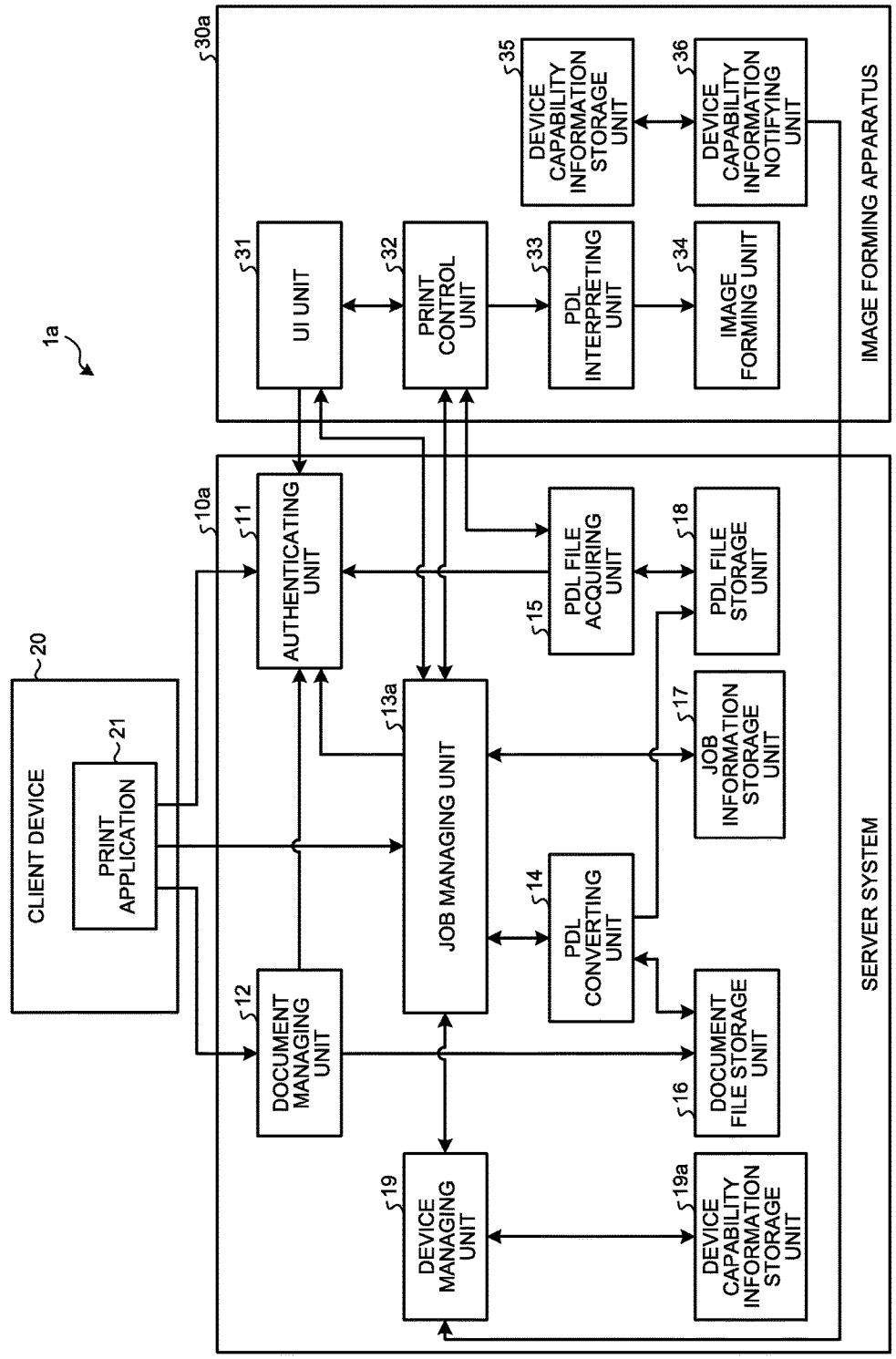
FIG. 20 is a diagram illustrating an example of a functional block configuration of a printing system according to a second embodiment of the present invention.

FIG. 20 is a diagram illustrating an example of a functional block configuration of the printing system according to the second embodiment. With reference to FIG. 20, functional block configurations of a server system 10a and an image forming apparatus 30a in a printing system 1a according to the second embodiment will be described. The configuration and the functions of the client device 20 are the same as those of the client device 20 of the first embodiment.

Functional Configuration of Server System

As illustrated in FIG. 20, the server system 10a of the printing system 1a includes the authenticating unit 11, the document managing unit 12 (the first receiving unit), a job managing unit 13a (the second receiving unit, the estimating unit, the selecting unit, and the registering unit), the PDL converting unit 14 (the converting unit), the PDL file acquiring unit 15 (the transmitting unit), the document file storage unit 16, the job information storage unit 17 (the storage unit), the PDL file storage unit 18, a device managing unit 19 (an example of the determining unit), and a device capability information storage unit 19a. Functions of the authenticating unit 11, the document managing unit 12, the PDL converting unit 14, the PDL file acquiring unit 15, the document file storage unit 16, the job information storage unit 17, and the PDL file storage unit 18 are the same as the functions described in the first embodiment.

The job managing unit 13a is a functional unit that registers and updates information on a print job (job information) and estimates, based on a job history, a PDL to which a document file is converted. Furthermore, the job managing unit 13a sends a request for verification of whether PDL estimation is correct or not to the device managing unit 19. The job managing unit 13a is implemented by, for example, a program executed by the CPU 101 illustrated in FIG. 2.

The device managing unit 19 is a functional unit that determines whether the list of the PDL types available for the image forming apparatus 30a, which is included in the device capability information stored in the device capability information storage unit 19a, includes the PDL type estimated by the job managing unit 13a (PDL availability determination). The device managing unit 19 is implemented by, for example, a program executed by the CPU 101 illustrated in FIG. 2.

The device capability information storage unit 19a is a functional unit that stores the device capability information on the image forming apparatus 30a, which is transmitted from a device capability information notifying unit 36 of the image forming apparatus 30a. The device capability information storage unit 19a is implemented by the external storage device 104 illustrated in FIG. 2.

The authenticating unit 11, the document managing unit 12, the job managing unit 13a, the PDL converting unit 14, the PDL file acquiring unit 15, the document file storage unit 16, the job information storage unit 17, the PDL file storage unit 18, the device managing unit 19, and the device capability information storage unit 19a of the server system 10a illustrated in FIG. 20 are functionally conceptual, and do not necessarily have to be configured in the same manner. For example, a plurality of the functional units illustrated as independent units in the server system 10a in FIG. 20 may be configured as a single functional unit. Alternatively, a function of a single functional unit in the server system 10a illustrated in FIG. 20 may be divided into a plurality of functions and implemented as a plurality of functional units.

Furthermore, a part or all of the authenticating unit 11, the document managing unit 12, the job managing unit 13, the PDL converting unit 14, the PDL file acquiring unit 15, and the device managing unit 19 may be implemented by a hardware circuit, such as an FPGA or an ASIC, instead of a software program.

Functional Configuration of Image Forming Apparatus

As illustrated in FIG. 20, the image forming apparatus 30a of the printing system 1a includes the UI unit 31, the print control unit 32, the PDL interpreting unit 33, the image forming unit 34, the device capability information storage unit 35, and the device capability information notifying unit 36. Functions of the UI unit 31, the print control unit 32, the PDL interpreting unit 33, the image forming unit 34, and the device capability information storage unit 35 are the same as the functions described in the first embodiment.

The device capability information notifying unit 36 is a functional unit that acquires, at the time of activation of the image forming apparatus 30a or the like, information on the capability of the image forming apparatus 30a (the device capability information) from the device capability information storage unit 35, and provides (transmits) the information to the device managing unit 19 of the server system 10a. The device capability information notifying unit 36 is implemented by, for example, a program executed by the CPU 301 illustrated in FIG. 4.

The UI unit 31, the print control unit 32, the PDL interpreting unit 33, the image forming unit 34, the device capability information storage unit 35, and the device capability information notifying unit 36 of the image forming apparatus 30a illustrated in FIG. 20 are functionally conceptual, and do not necessarily have to be configured in the same manner. For example, a plurality of the functional units illustrated as independent units in the image forming apparatus 30a illustrated in FIG. 20 may be configured as a single functional unit. Alternatively, a function of a single functional unit in the image forming apparatus 30a illustrated in FIG. 20 may be divided into a plurality of functions and implemented as a plurality of functional units.

Furthermore, a part or all of the print control unit 32, the PDL interpreting unit 33, and the device capability information notifying unit 36 as described above may be implemented by a program executed by the CPU 301 illustrated in FIG. 4, or may be implemented by a hardware circuit (for example, the ASIC 306 or the like).

Job Execution Operation when Estimation is Successful

Figure 21:
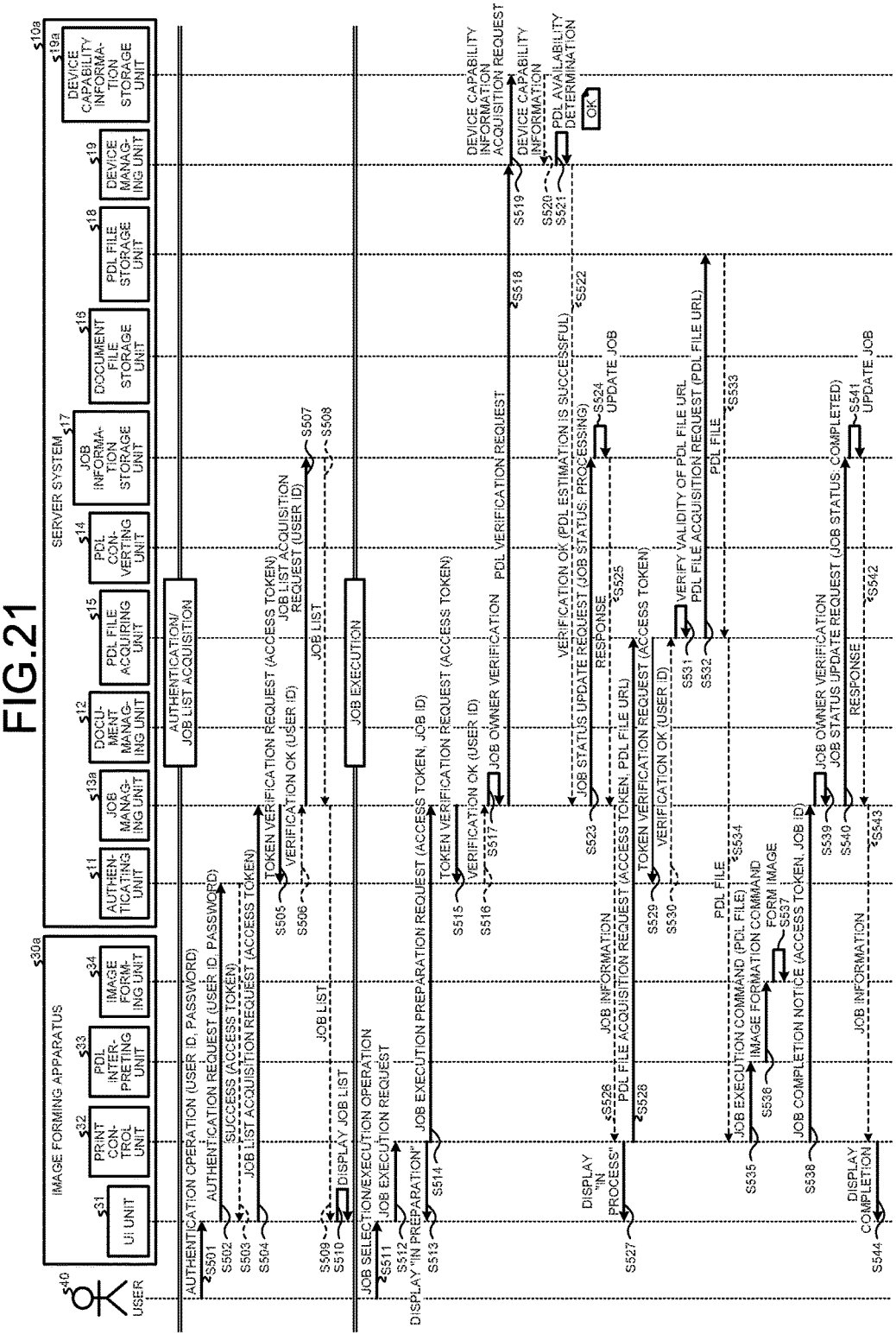
FIG. 21 is a sequence diagram illustrating an example of a job execution operation performed when PDL estimation is successful in the printing system according to the second embodiment.
Figure 22:
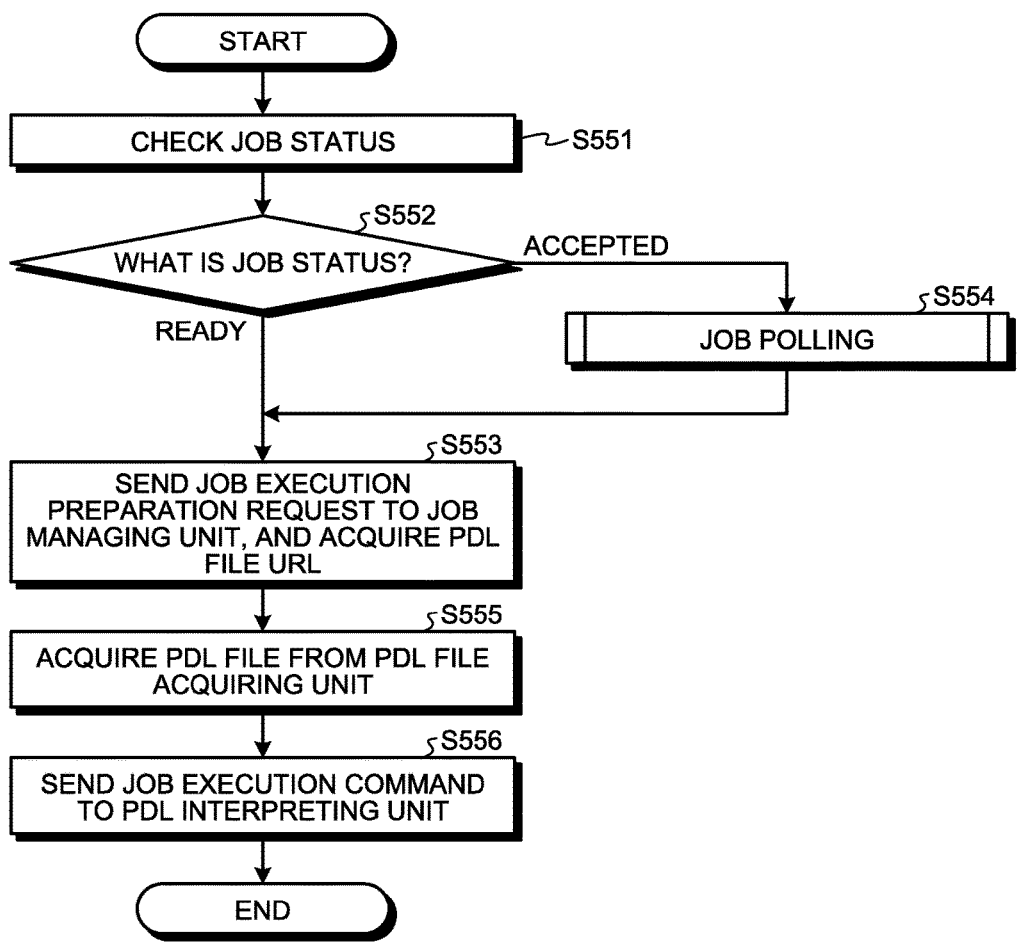
FIG. 22 is a flowchart illustrating an overview of the job execution operation in the printing system according to the second embodiment.
Figure 23:
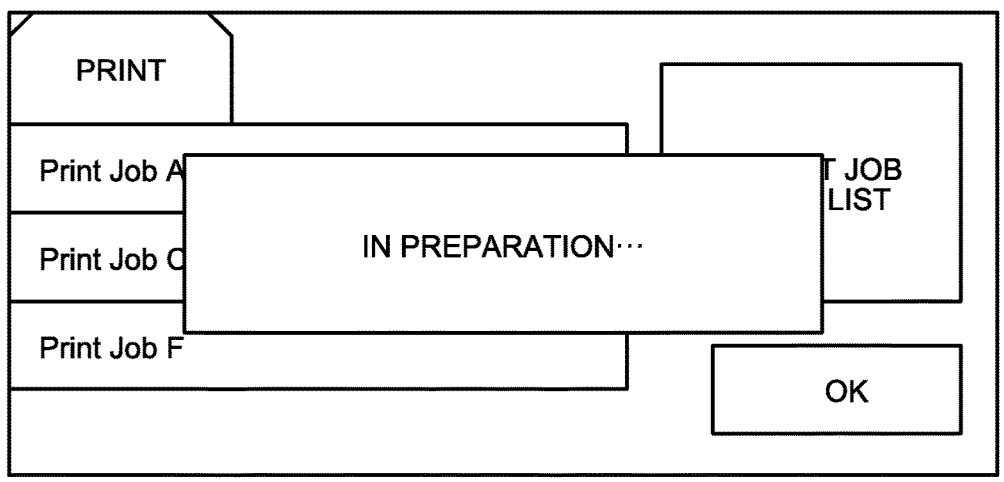
FIG. 23 is a diagram illustrating an example of a screen indicating that preparation for job execution is in process in an image forming apparatus according to the second embodiment.

FIG. 21 is a sequence diagram illustrating an example of a job execution operation performed when PDL estimation is successful in the printing system according to the second embodiment. FIG. 22 is a flowchart illustrating an overview of the job execution operation in the printing system according to the second embodiment. FIG. 23 is a diagram illustrating an example of a screen indicating that a job is in process in the image forming apparatus according to the second embodiment. With reference to FIGS. 21 to 23, the job execution operation performed when the PDL estimation is successful in the printing system 1*a* according to the second embodiment will be described.

Steps S501 to S510

The processes at Steps S501 to S510 are the same as the processes at Steps S301 to S310 in FIG. 13, respectively. Accordingly, the image forming apparatus 30*a* receives approval for authentication from the server system 10*a*, the job managing unit 13*a* acquires a list of pieces of job information (a job list) corresponding to an authentication-target user ID, and the image forming apparatus 30*a* receives the job list from the job managing unit 13*a*.

Step S511

The user 40 performs a job selection/execution operation of selecting a job to be executed, that is, a job for performing printout (image formation), and then pressing an OK button in the job selection/execution screen displayed on the UI unit 31 as illustrated in FIG. 14.

Step S512

The UI unit 31 sends a job execution request to execute the selected job to the print control unit 32. Here, it is assumed that the job status of the selected job is "ready".

Step S513

The print control unit 32 displays a screen for notifying the user 40 that job execution is in preparation on the UI unit 31 as illustrated in FIG. 23.

Step S514

The print control unit 32 transmits a job execution preparation request including the job ID of the job selected at Step S511 and the access token acquired by the UI unit 31 to the job managing unit 13*a* of the server system 10*a*.

Step S515

Upon receiving the job execution preparation request, the job managing unit 13*a* sends a token verification request including the received access token to the authenticating unit 11.

Step S516

Upon receiving the token verification request, the authenticating unit 11 verifies the validity of the received access token, and sends a verification result to the job managing unit 13*a*. The verification method is the same as the method described at Step S109 in FIG. 6. In FIG. 21, the authenticating unit 11 sends, as the verification result, information that indicates "verification OK" and that includes the user ID corresponding to the access token to the job managing unit 13*a*.

Step S517

The job managing unit 13*a* performs owner verification of the job identified by the job ID included in the job execution preparation request. Specifically, the job managing unit 13*a* compares the user ID included in the verification result sent from the authenticating unit 11 with the user ID included in the job information identified by the job ID included in the job execution preparation request, and determines that an owner of the job is valid when the user IDs are identical.

Step S518

The job managing unit 13*a* sends a PDL verification request, which includes the PDL type (the estimated PDL type) included in the job information identified by the job ID included in the job execution preparation request and which requests verification of whether the PDL estimation is correct, to the device managing unit 19.

Steps S519 and S520

Upon receiving the PDL verification request, the device managing unit 19 sends a device capability information acquisition request to acquire device capability information including a list of PDL types available for the image forming apparatus 30*a* to the device capability information storage unit 19*a*. Upon receiving the device capability information acquisition request, the device capability information storage unit 19*a* reads the device capability information and sends the device capability information to the device managing unit 19.

Step S521

Upon receiving the device capability information, the device managing unit 19 determines whether the list of the PDL types available for the image forming apparatus 30*a*, which is included in the device capability information, includes the PDL type included in the job information on the job selected at Step S511 (the PDL type estimated by the job managing unit 13*a*) (the PDL availability determination). In FIG. 21, it is assumed that the device managing unit 19 determines that, as a result of the PDL availability determination, the list of the available PDL types included in the device capability information includes the PDL type included in the job information on the job selected at Step S511, that is, the PDL estimation performed by the job managing unit 13*a*, which is the same process as the process at Step S120 in FIG. 6 as described above, is successful.

Step S522

The device managing unit 19 sends, as the verification result, information that indicates "verification OK" and that includes information indicating that the PDL estimation is successful to the job managing unit 13*a*.

Step S523

Upon receiving the information that indicates "verification OK" and that includes information indicating that the PDL estimation is successful, the job managing unit 13*a* sends a job status update request for specifying "processing" as the job status to the job information storage unit 17 in order to update, in the job list in the job information storage unit 17, the job information identified by the job ID included in the job execution preparation request.

Step S524

Upon receiving the job status update request, the job information storage unit 17 updates the job status of the corresponding job information from "ready" to "processing" in accordance with the specification in the job status update request.

Step S525

The job information storage unit 17 returns a response indicating that the update is performed in response to the job status update request to the job managing unit 13*a*.

Step S526

The job managing unit 13*a* transmits the job information, which corresponds to the user ID corresponding to the access token and whose job status has been updated to "processing", to the print control unit 32 of the image forming apparatus 30*a*.

Step S527

The print control unit 32 displays a screen for notifying the user 40 that the the job is in process on the UI unit 31 as illustrated in FIG. 17.

Steps S528 to S544

The processes at Steps S528 to S544 are the same as the processes at Steps S325 to S341 in FIG. 13, respectively. Accordingly, the print control unit 32 acquires the PDL file from the server system 10*a*, and performs a printing operation based on the PDL file.

Through Steps S501 to S544 as described above, the job execution operation is performed in the printing system 1*a* when the PDL estimation is successful. With reference to FIG. 22, an operation for executing a job will be described in detail below.

Steps S551 and S552

Upon receiving the job execution request from the UI unit 31, the print control unit 32 checks whether the job status in the job information on the job selected on the UI unit 31 is "ready" or "accepted". If the job status is "ready" (READY at Step S552), the process proceeds to Step S553. If the job status is "accepted" (ACCEPTED at Step S552), the process proceeds to Step S554.

Step S553

The print control unit 32 transmits a job execution preparation request including the job ID of the selected job or the like to the job managing unit 13*a* of the server system 10*a*. Upon receiving the job execution preparation request, the job managing unit 13*a* updates the job status of the job ID included in the job execution preparation request to "processing", and transmits the job information corresponding to the job ID to the print control unit 32. Here, the job information includes the PDL file URL. Then, the process proceeds to Step S555.

Step S554

If the job status in the job information on the job selected on the UI unit 31 is "accepted", the print control unit 32 determines that the document file corresponding to the job information has not yet been converted to a PDL, and performs a job polling operation as illustrated in FIG. 16 until the job status is changed to "ready". The job polling operation is the same as described above with reference to FIG. 16. Then, the process proceeds to Step S553.

Step S555

The print control unit 32 transmits a PDL file acquisition request including the PDL file URL included in the received job information or the like to the PDL file acquiring unit 15 of the server system 10*a*. The PDL file acquiring unit 15 acquires a PDL file from a storage area specified by the PDL file URL in the PDL file storage unit 18. The PDL file acquiring unit 15 transmits the acquired PDL file to the print control unit 32 of the image forming apparatus 30*a*. Then, the process proceeds to Step S556.

Step S556

The print control unit 32 sends a job execution command including the received PDL file to the PDL interpreting unit 33. The PDL interpreting unit 33 interprets the received PDL file, and sends an image formation command to cause the image forming unit 34 to perform printout (image formation) to the image forming unit 34. Upon receiving the image formation command, the image forming unit 34 performs a printing operation (image forming operation) of printing the contents of the PDL file interpreted by the PDL interpreting unit 33 on a sheet.

Through Steps S551 to S556 as described above, the job execution operation is performed. The operations at Steps S551 to S556 correspond to the operations at Steps S512 to S537 in FIG. 21, respectively. In this manner, the process performed by the print control unit 32 as illustrated in FIG. 22 does not include a process of acquiring the device capability information and performing the PDL availability determination among the processes illustrated in FIG. 15 as described in the first embodiment. The process of acquiring the device capability information and performing the PDL availability determination is performed by the server system 10*a*.

Job Execution Operation when Estimation has Failed

Figure 24:
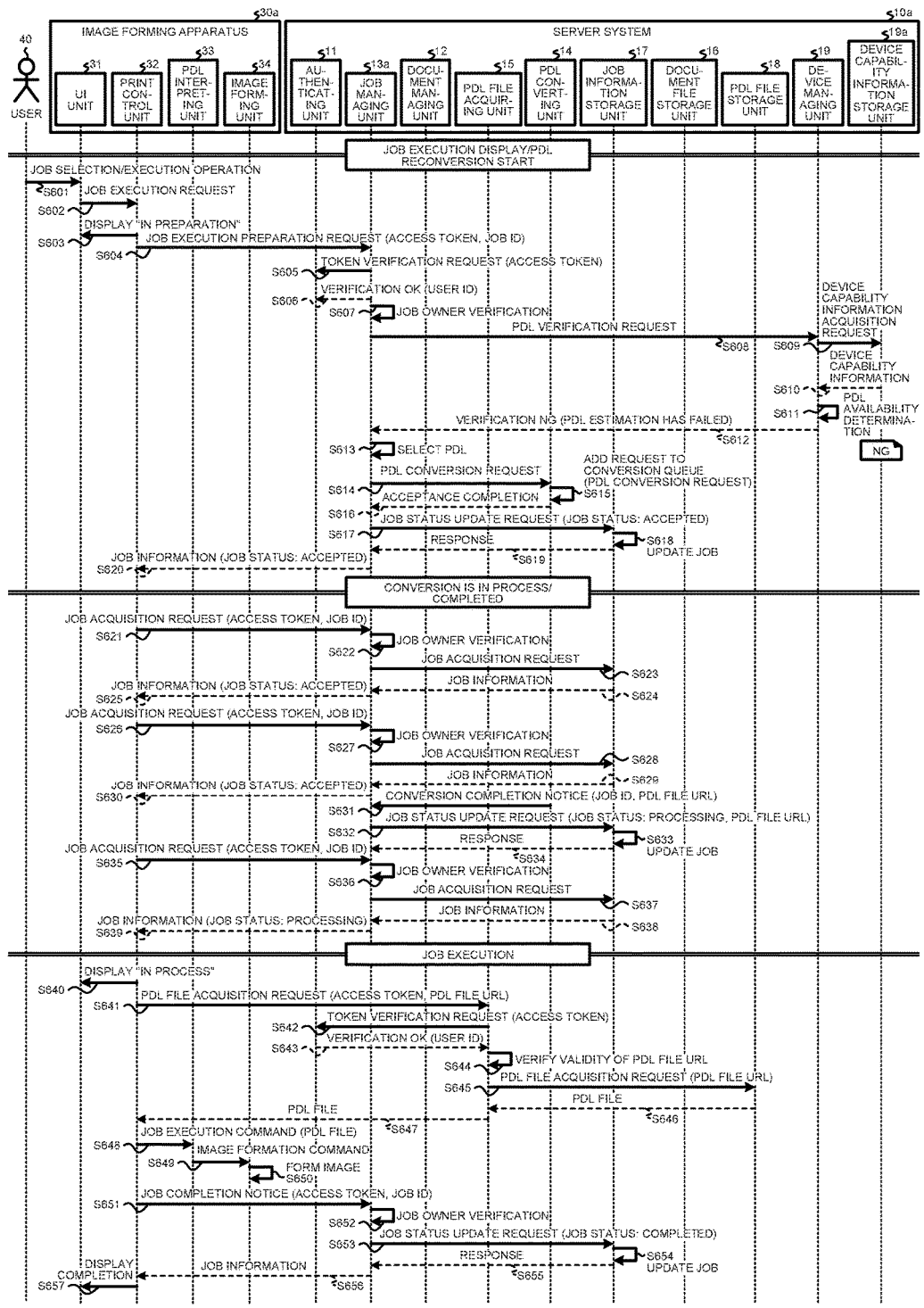
FIG. 24 is a sequence diagram illustrating an example of a job execution operation performed when the PDL estimation has failed in the printing system according to the second embodiment.

FIG. 24 is a sequence diagram illustrating an example of a job execution operation performed when the PDL estimation has failed in the printing system according to the second embodiment. With reference to FIG. 24, the job execution operation performed when the PDL estimation has failed in the printing system 1 according to the second embodiment will be described. It is assumed that the operations at Steps S501 to S510 in FIG. 21 are performed in advance.

Steps S601 to S610

The processes at Steps S601 to S610 are the same as the processes at Steps S511 to S520 in FIG. 21, respectively.

Step S611

Upon receiving the device capability information, the device managing unit 19 determines whether the list of the PDL types available for the image forming apparatus 30*a*, which is included in the device capability information, includes the PDL type included in the job information on the job selected at Step S601 (the PDL type estimated by the job managing unit 13*a*) (the PDL availability determination). In FIG. 24, it is assumed that the device managing unit 19 determines that, as a result of the PDL availability determination, the list of the available PDL types included in the device capability information does not include the PDL type included in the job information on the job selected at Step S601, that is, the PDL estimation performed by the job managing unit 13*a* has failed.

Step S612

The device managing unit 19 sends, as the verification result, information that indicates "verification NG", that includes information indicating that the PDL estimation has failed, and that includes the list of the PDL types available for the image forming apparatus 30*a* to the job managing unit 13*a*.

Step S613

The job managing unit 13*a* compares the list of the PDL types available for the image forming apparatus 30*a*, which is included in the received information indicating "verification NG", with a list of PDL types available for conversion performed by the PDL converting unit 14, and selects a PDL type included in both of the lists. Specifically, the job managing unit 13*a* may select an arbitrary PDL type from among the PDL types included in both of the lists, or may select a PDL type in order of priority that is determined in advance for the PDL types, for example. Furthermore, when a PDL type is selected in order of priority, it may be possible to select the PDL type by referring to a table in which the PDL types and the order of priority are associated, for example. The job managing unit 13*a* does not necessarily have to select the PDL type, but the print control unit 32 may specify a PDL compliant with the image forming apparatus 30*a* and cause the job managing unit 13*a* to select the PDL type.

Step S614

Upon completing the selection of the PDL type, the job managing unit 13a sends a PDL conversion request including the job ID included in the job execution preparation request, the user ID included in the verification result sent from the authenticating unit 11, and the selected PDL type to the PDL converting unit 14 in order to convert the document file to the selected PDL.

Steps S615 to S620

The processes at Steps S615 to S620 are the same as the processes at Steps S411 to S416 in FIG. 18, respectively.

Step S621

The print control unit 32 transmits a job acquisition request including the access token acquired by the UI unit 31 and the job ID included in the job execution preparation request to the job managing unit 13a of the server system 10a.

Steps S622 to S625

The processes at Steps S622 to S625 are the same as the processes at Steps S418 to S421 in FIG. 18, respectively.

Step S626

The print control unit 32 transmits a job acquisition request including the access token acquired by the UI unit 31 and the job ID included in the job execution preparation request to the job managing unit 13a of the server system 10a again.

Steps S627 to S630

The processes at Steps S627 to S630 are the same as the processes at Steps S622 to S625, respectively.

Step S631

Here, it is assumed that the PDL converting unit 14 of the server system 10a preferentially performs the same processes as the processes at Steps S201 to S207 in FIG. 10 on the PDL conversion request that has been added to the conversion queue at Step S615, and sends, to the job managing unit 13a, a conversion completion notice indicating that the document file corresponding to the job ID included in the job acquisition request received from the print control unit 32 has been converted to the selected PDL. The conversion completion notice includes the PDL file URL indicating the storage destination of the PDL file in the PDL file storage unit 18 and the job ID included in the PDL conversion request received from the job managing unit 13a.

Step S632

Upon receiving the conversion completion notice, the job managing unit 13 sends a job status update request that includes the PDL file URL and a job status in which "processing" is specified to the job information storage unit 17 in order to update in order to update, in the job list in the job information storage unit 17, the job information identified by the job ID included in the PDL conversion request. The reason why the job status is set to "processing" instead of "ready" is that the job execution preparation request has already been received from the image forming apparatus 30a at Step S604. It is not always necessary to set the job status to "processing", but it may be possible to write "ready" once, display a screen indicating that the job is in process (Step S640), and then update the job status to "processing" as illustrated in FIG. 18 as described in the first embodiment.

Step S633

Upon receiving the job status update request, the job information storage unit 17 sets, in the corresponding job information, the PDL file URL included in the job status update request, and updates the job status from "accepted" to "processing".

Step S634

The job information storage unit 17 returns a response indicating that the update is performed in response to the job status update request to the job managing unit 13a.

Step S635

The print control unit 32 transmits a job acquisition request including the access token acquired by the UI unit 31 and the job ID included in the job execution preparation request to the job managing unit 13a of the server system 10a again.

Steps S636 to S638

The processes at Steps S636 to S638 are the same as the processes at Steps S622 to S624, respectively.

Step S639

The job managing unit 13a transmits the received job information to the print control unit 32 of the image forming apparatus 30a. The print control unit 32 confirms that the job status of the received job information has been updated to "processing" and the document file corresponding to the job information has been converted to the PDL selected at Step S613.

Steps S640 to S657

The processes at Steps S640 to S657 are the same as the processes at Steps S527 to S544 in FIG. 21, respectively.

Through Steps S601 to S657 as described above, the job execution operation is performed in the printing system 1a when the PDL estimation has failed.

In the printing system 1 according to the first embodiment, the PDL availability determination is performed by the image forming apparatus 30; however, in the printing system 1a according to the second embodiment, the PDL availability determination is performed by the server system 10a. Therefore, the printing system 1a according to the second embodiment can achieve the same effects as those achieved by the printing system 1 according to the first embodiment.

Furthermore, in the first embodiment, each of the image forming apparatuses 30 that communicates with the server system 10 needs to have a function of the PDL availability determination; however, in the second embodiment, only the server system 10a needs to have the function of the PDL availability determination and each of the image forming apparatuses 30a need not have the same function. Therefore, it is possible to obtain a more versatile system configuration.

When at least any one of the functional units of the server system 10 (10a), the client device 20, and the image forming apparatus 30 (30a) is implemented by execution of a program, the program is provided by being incorporated in a ROM or the like in advance. Furthermore, the program executed by the printing system 1 (1a) of the above-described embodiments may be provided by being recorded in a computer-readable recording medium, such as a CD-ROM, a flexible disk (FD), a CD-R, or a DVD, in a computer-installable or computer-executable file format. Moreover, the program executed by the printing system 1 (1a) of the above-described embodiments may be stored in a computer connected to a network, such as the Internet, and provided by being downloaded via the network. Furthermore, the program executed by the printing system 1 (1a) of the above-described embodiments may be provided or distributed via a network, such as the Internet. Moreover, the program executed by the printing system 1 (1a) of the above-described embodiments has a module structure including at least any one of the above-described functional units. As actual hardware, a CPU reads the program from the above-described ROM and executes the program, so that the above-described functional units are loaded and generated on a main storage device.

According to an embodiment of the present invention, it is possible to reduce a time taken from determination of an apparatus that performs printout to execution of printing.

The above-described embodiments are illustrative and do not limit the present invention. Thus, numerous additional modifications and variations are possible in light of the above teachings. For example, at least one element of different illustrative and exemplary embodiments herein may be combined with each other or substituted for each other within the scope of this disclosure and appended claims. Further, features of components of the embodiments, such as the number, the position, and the shape are not limited the embodiments and thus may be preferably set. It is therefore to be understood that within the scope of the appended claims, the disclosure of the present invention may be practiced otherwise than as specifically described herein.

The method steps, processes, or operations described herein are not to be construed as necessarily requiring their performance in the particular order discussed or illustrated, unless specifically identified as an order of performance or clearly identified through the context. It is also to be understood that additional or alternative steps may be employed.

Further, any of the above-described apparatus, devices or units can be implemented as a hardware apparatus, such as a special-purpose circuit or device, or as a hardware/software combination, such as a processor executing a software program.

Further, as described above, any one of the above-described and other methods of the present invention may be embodied in the form of a computer program stored in any kind of storage medium. Examples of storage mediums include, but are not limited to, flexible disk, hard disk, optical discs, magneto-optical discs, magnetic tapes, non-volatile memory, semiconductor memory, read-only-memory (ROM), etc.

Alternatively, any one of the above-described and other methods of the present invention may be implemented by an application specific integrated circuit (ASIC), a digital signal processor (DSP) or a field programmable gate array (FPGA), prepared by interconnecting an appropriate network of conventional component circuits or by a combination thereof with one or more conventional general purpose microprocessors or signal processors programmed accordingly.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA) and conventional circuit components arranged to perform the recited functions.

What is claimed is:

1. A printing system that includes one or more of information processing apparatuses and an image forming apparatus, and that generates page description language (PDL) data by converting print target data received from the one or more of information processing apparatuses to a PDL, and transmits the PDL data to the image forming apparatus, the printing system further comprising:
   a storage configured to store therein pieces of job information on print jobs; and
   circuitry configured to execute:
      receiving the print target data from the one or more of information processing apparatuses;
      receiving a history of pieces of job information corresponding to user identification information corresponding to the print target data from the storage;
      estimating, based on the history, a type of a PDL to which the print target data is converted;
      generating PDL data by converting the print target data to the PDL of which the type is estimated;
      transmitting the PDL data to the image forming apparatus when the estimated PDL is available for the image forming apparatus; and
      selecting, when the estimated PDL is not available for the image forming apparatus, a PDL available for the image forming apparatus and re-converting the print target data to the selected PDL.

2. The printing system according to claim 1, wherein the circuitry is further configured to determine whether the estimated PDL is available for the image forming apparatus.

3. The printing system according to claim 1, wherein the image forming apparatus includes circuitry configured to determine whether the estimated PDL is available for the image forming apparatus.

4. The printing system according to claim 1, wherein the circuitry is configured to select a PDL from PDLs available for the image forming apparatus in a predetermined order of priority.

5. The printing system according to claim 1, wherein the circuitry is configured to select a PDL specified by the image forming apparatus from PDLs available for the image forming apparatus.

6. The printing system according to claim 1, wherein the circuitry is further configured to newly register, after the type of the PDL is estimated, a piece of job information including the estimated type of the PDL in the storage, and convert the print target data to the PDL of the type included in the piece of the job information.

7. The printing system according to claim 1, wherein the circuitry is configured to estimate the type of the PDL to which the print target data is converted, based on statistics of types of PDLs included in the pieces of the job information in the history.

8. The printing system according to claim 7, wherein the circuitry receives a history of a predetermined number of pieces of job information from the storage.

9. The printing system according to claim 7, wherein the circuitry receives a history of pieces of job information with registration dates and times in a predetermined range from the storage.

10. The printing system according to claim 7, wherein the circuitry receives a history of a predetermined number of pieces of job information in order from a newest registration date and time from the storage.

11. The printing system according to claim 7, wherein the circuitry estimates a type of a PDL that is most frequently used among the types of the PDLs included in the pieces of the job information in the history to be the type of the PDL to which the print target data is converted.

12. The printing system according to claim 7, wherein the circuitry calculates a reference value related to use frequency by assigning a greater weight to a type of a PDL of a piece of job information with a newest registration date and time among the pieces of the job information in the history, and estimates a type of a PDL with the greatest reference value to be the type of the PDL to which the print target data is converted.

13. The printing system according to claim 1, wherein the circuitry is configured to re-convert the print target data to the selected PDL with higher priority than conversion to the PDL of which the type has been estimated.

14. The printing system according to claim 1, wherein
the one or more of information processing apparatuses transmit the print target data to the circuitry, and
the image forming apparatus performs printout based on the converted PDL data.

15. A server apparatus that generates page description language (PDL) data by converting print target data received from one or more of information processing apparatuses to a PDL, and transmits the PDL data to an image forming apparatus, the server apparatus comprising:
 a storage configured to store therein pieces of job information on print jobs; and
 circuitry configured to:
  receive the print target data from the one or more of information processing apparatuses;
  receive a history of pieces of job information corresponding to user identification information corresponding to the print target data from the storage;
  estimate, based on the history, a type of a PDL to which the print target data is converted;
  generate PDL data by converting the print target data to the PDL of which the type is estimated;
  transmit the PDL data to the image forming apparatus when the estimated PDL is available for the image forming apparatus; and
  select, when the estimated PDL is not available for the image forming apparatus, a PDL available for the image forming apparatus and re-convert the print target data to the selected PDL.

16. The server apparatus according to claim 15, wherein the circuitry is further configured to determine whether the estimated PDL is available for the image forming apparatus.

17. An information processing method performed by a printing system that generates page description language (PDL) data by converting print target data received from one or more of information processing apparatuses, and transmits the PDL data to an image forming apparatus, the information processing method comprising:
 receiving the print target data from the one or more of information processing apparatuses;
 receiving, from a storage that stores therein pieces of job information on print jobs, a history of pieces of job information corresponding to user identification information corresponding to the print target data;
 estimating, based on the history, a type of a PDL to which the print target data is converted;
 generating PDL data by converting the print target data to the PDL of which the type is estimated;
 determining whether the estimated PDL is available for the image forming apparatus;
 transmitting the PDL data to the image forming apparatus when the estimated PDL is available for the image forming apparatus; and
 selecting, when the estimated PDL is not available for the image forming apparatus, a PDL available for the image forming apparatus and re-converting the print target data to the selected PDL.

* * * * *